United States Patent
Skikavich

(10) Patent No.: US 11,584,285 B2
(45) Date of Patent: Feb. 21, 2023

(54) MOTORIZED WHEELBARROW

(71) Applicant: Madness Machinery Manufacturing Inc., Palgrave (CA)

(72) Inventor: Vincent Skikavich, Palgrave (CA)

(73) Assignee: Madness Machinery Manufacturing Inc., Palgrave (CA)

( * ) Notice: Subject to any disclaimer, the term of this patent is extended or adjusted under 35 U.S.C. 154(b) by 239 days.

(21) Appl. No.: 17/155,383

(22) Filed: Jan. 22, 2021

(65) Prior Publication Data

US 2022/0234486 A1   Jul. 28, 2022

(51) Int. Cl.
*B60P 1/28* (2006.01)
*B60K 23/02* (2006.01)
*B60T 7/10* (2006.01)
*B60K 17/356* (2006.01)
*B62B 5/00* (2006.01)

(52) U.S. Cl.
CPC ............ *B60P 1/286* (2013.01); *B60K 17/356* (2013.01); *B60K 23/02* (2013.01); *B60T 7/102* (2013.01); *B62B 5/0046* (2013.01)

(58) Field of Classification Search
CPC ........ B60P 1/286; B60K 17/356; B90T 7/102; B62B 5/0046
USPC ....... 298/2, 3, 1 c, 7; 280/653, 47.31, 47.23; 180/19.1, 19.3, 19.2
See application file for complete search history.

(56) References Cited

U.S. PATENT DOCUMENTS

| | | | | |
|---|---|---|---|---|
| 5,211,254 A | * | 5/1993 | Harris, III ............. | B62B 5/0026 280/47.23 |
| 5,878,827 A | * | 3/1999 | Fox ........................ | B62D 51/04 180/19.1 |
| 6,409,273 B1 | * | 6/2002 | Campbell ............. | B62B 5/0026 298/3 |
| 8,997,903 B2 | * | 4/2015 | Vandelinde ............... | B62B 1/18 180/19.1 |

* cited by examiner

*Primary Examiner* — D Glenn Dayoan
*Assistant Examiner* — Sunsurraye Westbrook

(57) ABSTRACT

A motorized wheelbarrow including a motor and a drive pulley that rotates when the motor is operating. The motorized wheelbarrow also includes wheels and a drive train assembly for transmitting power from the motor to the wheels. The motorized wheelbarrow also includes a clutch assembly movable between a connected condition, in which the motor and the drive train assembly are connected by the clutch assembly, and a disconnected condition, in which the motor and the drive train assembly are not connected with each other, and a brake assembly movable between an engaged condition, in which the brake assembly resists rotation of the wheels, and a disengaged condition, in which the brake assembly does not resist rotation of the wheels. Both of the clutch assembly and the brake assembly are controlled by a single control assembly so that the clutch assembly and the brake assembly are mutually functionally exclusive.

16 Claims, 28 Drawing Sheets

MOTORIZED WHEELBARROW

FIELD OF THE INVENTION

The present invention is a motorized wheelbarrow.

BACKGROUND OF THE INVENTION

In the prior art, motorized wheelbarrows have a number of disadvantages. For example, the controls for engaging the drive train and for engaging brakes are typically separate, which often results in an operator causing the clutch to be engaged at the same time as the brake is engaged. Consequently, in the prior art motorized wheelbarrows, certain components are frequently subjected to significant wear, causing premature brake failure, and/or premature failure of other components.

SUMMARY OF THE INVENTION

For the foregoing reasons, there is a need for a motorized wheelbarrow that overcomes or mitigates one or more of the defects and disadvantages of the prior art.

In its broad aspect, the invention provides a motorized wheelbarrow including a motor and a drive pulley that rotates when the motor is operating. The motorized wheelbarrow also includes wheels and a drive train assembly for transmitting power from the motor to the wheels. The motorized wheelbarrow also includes a clutch assembly movable between a connected condition, in which the drive pulley and the drive train assembly are connected by the clutch assembly, and a disconnected condition, in which the drive pulley and the drive train assembly are not connected with each other. The motorized wheelbarrow also includes a brake assembly movable between an engaged condition, in which the brake assembly resists rotation of the wheels, and a disengaged condition, in which the brake assembly does not resist rotation of the wheels. Both of the clutch assembly and the brake assembly are controlled by a single control assembly so that the clutch assembly and the brake assembly are mutually functionally exclusive.

Due to their mutual functional exclusivity, it is not possible for the clutch assembly to be in the connected condition at the same time as the brake assembly is in the engaged condition thereof. As a result, the extent to which the components of the clutch assembly and the brake assembly are subjected to wear is significantly reduced, as compared to the typical prior art unit.

The mutual functional exclusivity of the clutch assembly and the brake assembly is also a safety feature, as there is a very low risk of inadvertent movement of the clutch assembly to its connected condition.

BRIEF DESCRIPTION OF THE DRAWINGS

The invention will be better understood with reference to the attached drawings, in which.

DETAILED DESCRIPTION

Figure 1:
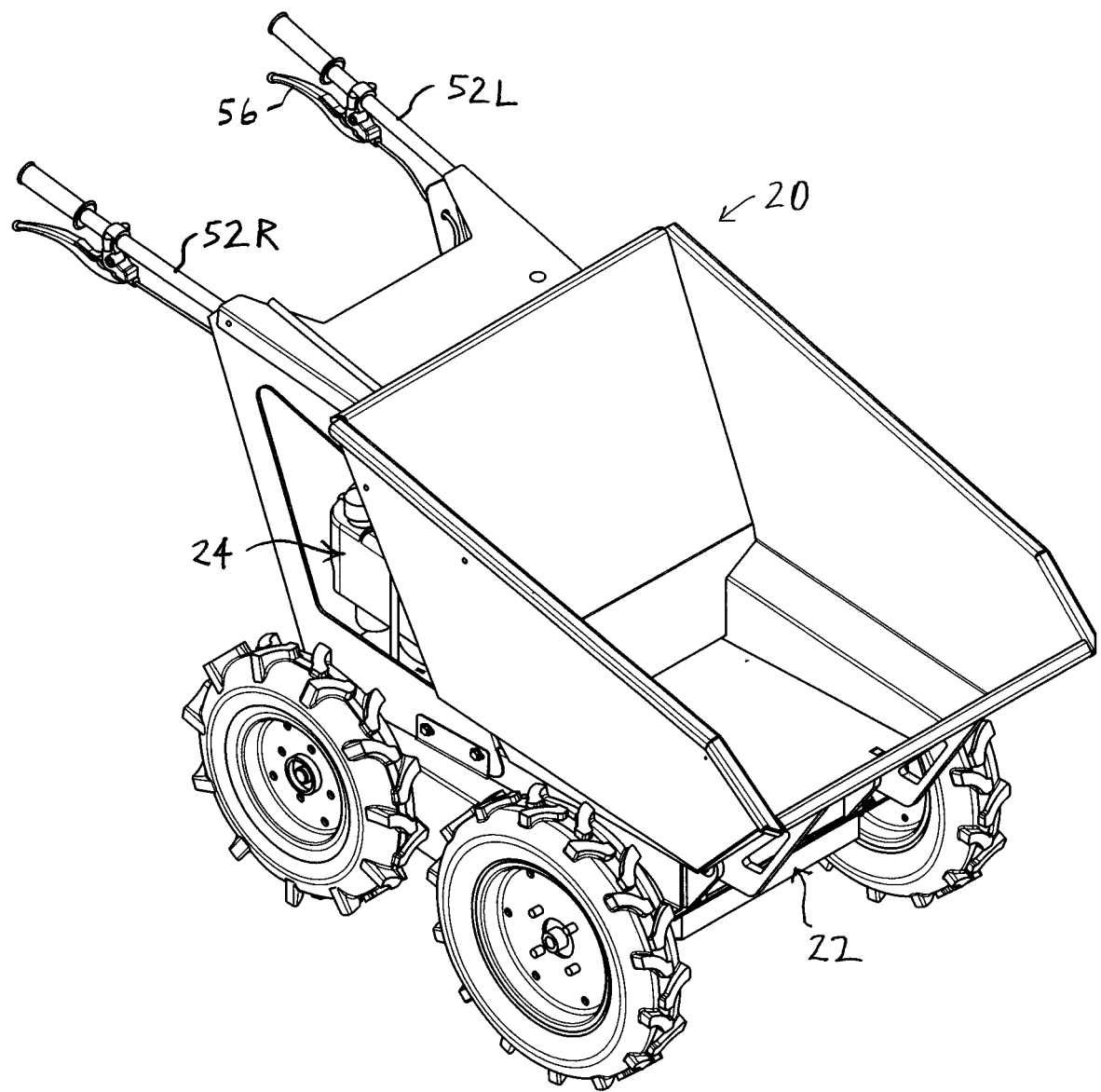
FIG. 1 is an isometric view of an embodiment of a motorized wheelbarrow of the invention.

In the attached drawings, like reference numerals designate corresponding elements throughout. Reference is made to FIGS. 1-9F to describe an embodiment of a motorized wheelbarrow in accordance with the invention indicated generally by the numeral 20.

In one embodiment, the motorized wheelbarrow 20 preferably includes a frame assembly 22, and a motor assembly 24 mounted to the frame assembly 22 (FIG. 1). As will be described, the motor assembly 24 preferably includes a motor 26 (FIGS. 2A, 2B, 6) and a drive pulley 28 (FIG. 7B) that rotates when the motor 26 is operating.

Figure 7A:
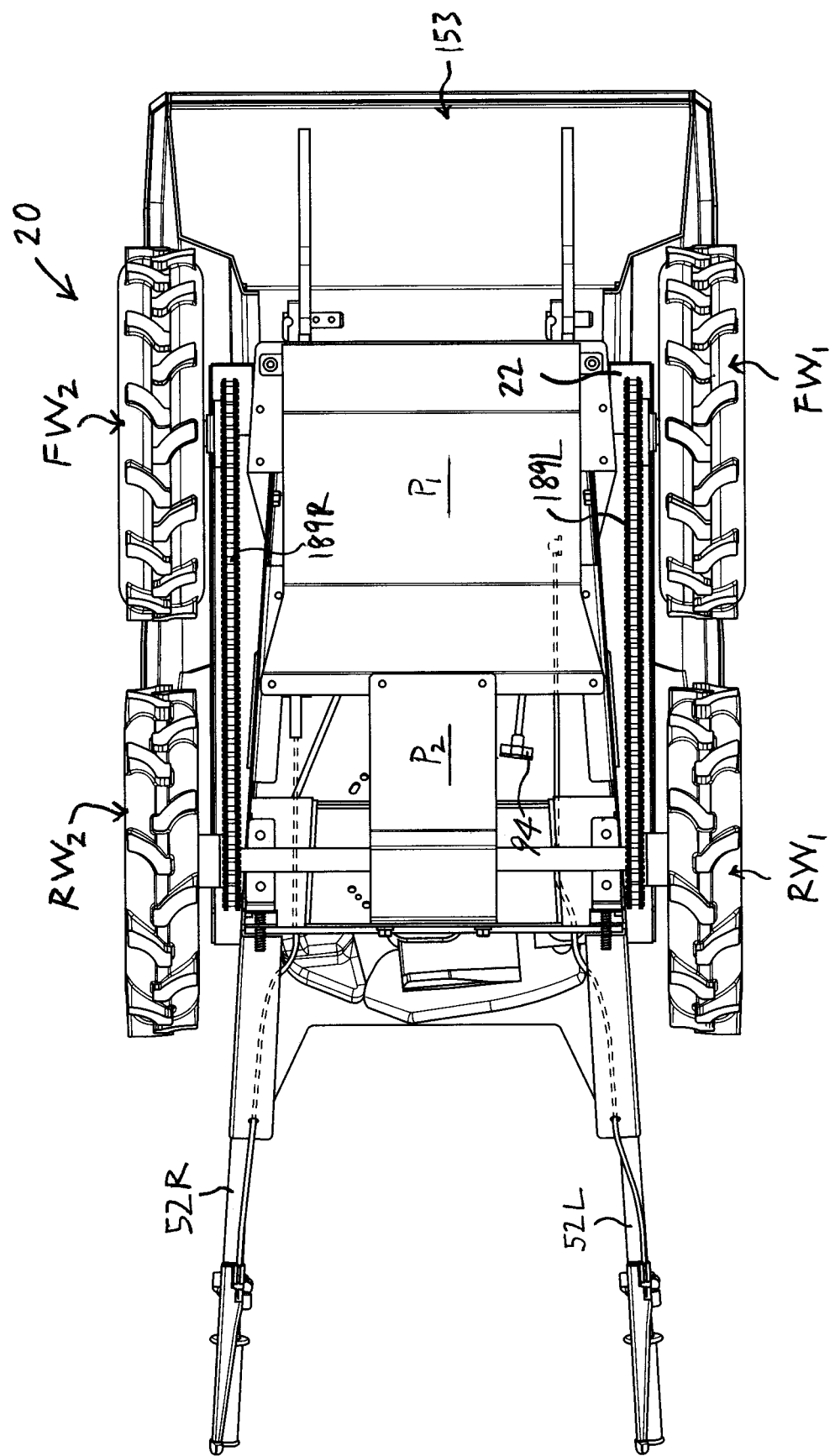
FIG. 7A is a bottom view of the motorized wheelbarrow of FIGS. 1-6.
Figure 7B:
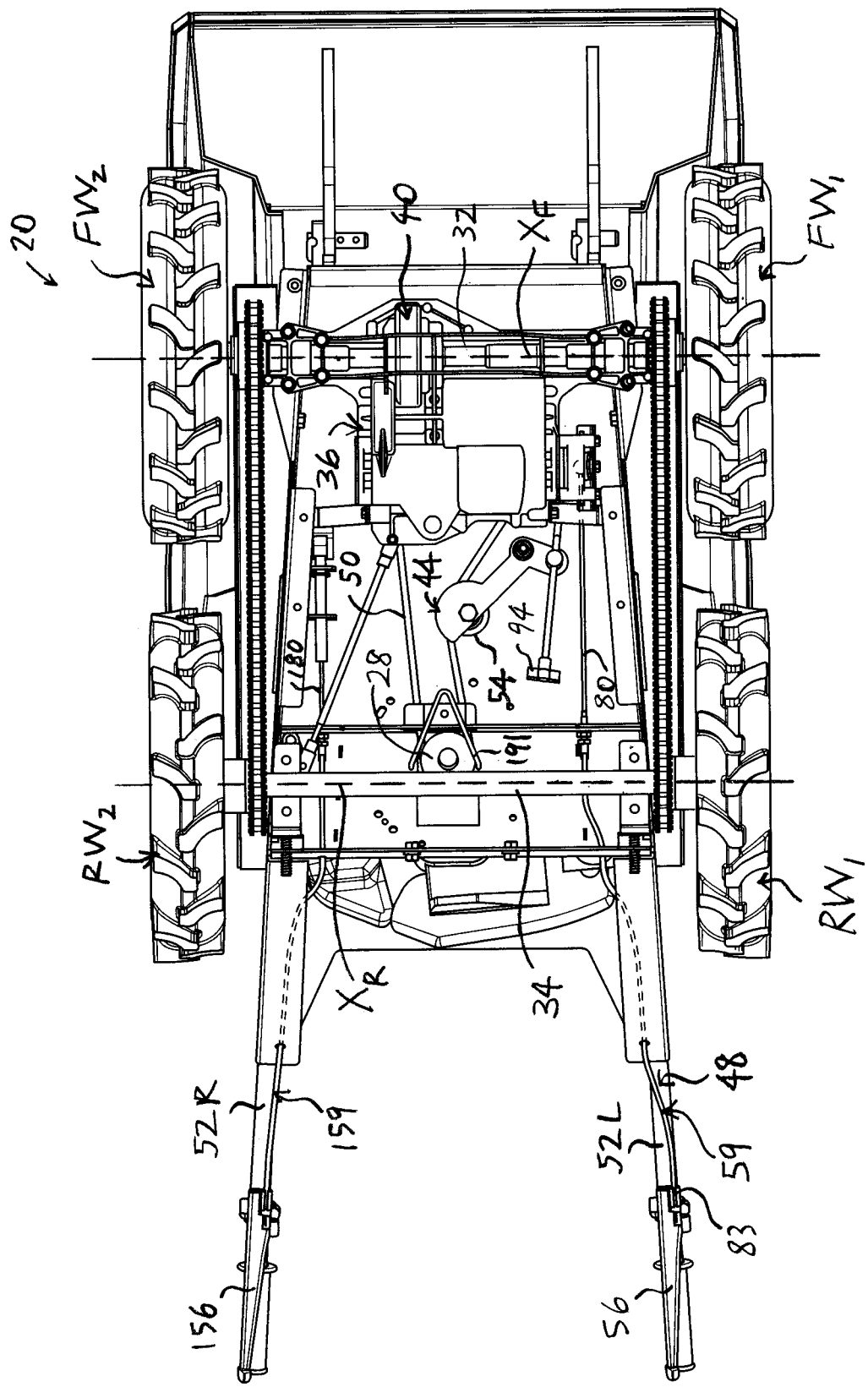
FIG. 7B is a bottom view of the motorized wheelbarrow of FIGS. 1-7A, with elements omitted.

It is also preferred that the motorized wheelbarrow 20 includes a wheel assembly 30 (FIGS. 1, 7A). The wheel assembly 30 preferably includes front and rear axles 32, 34 that are mounted to the frame assembly 22 (FIG. 7B). As can be seen in FIG. 7B, the front and rear axles 32, 34 define respective front and rear axes "$X_F$" and "$X_R$". Preferably, the wheel assembly 30 also includes four wheels, including two front wheels "$FW_1$", "$FW_2$" that are rotatably mounted to the front axle 32, and two rear wheels "$RW_1$", "$RW_2$" that are rotatably mounted to the rear axle 34 (FIG. 7B).

Figure 7C:
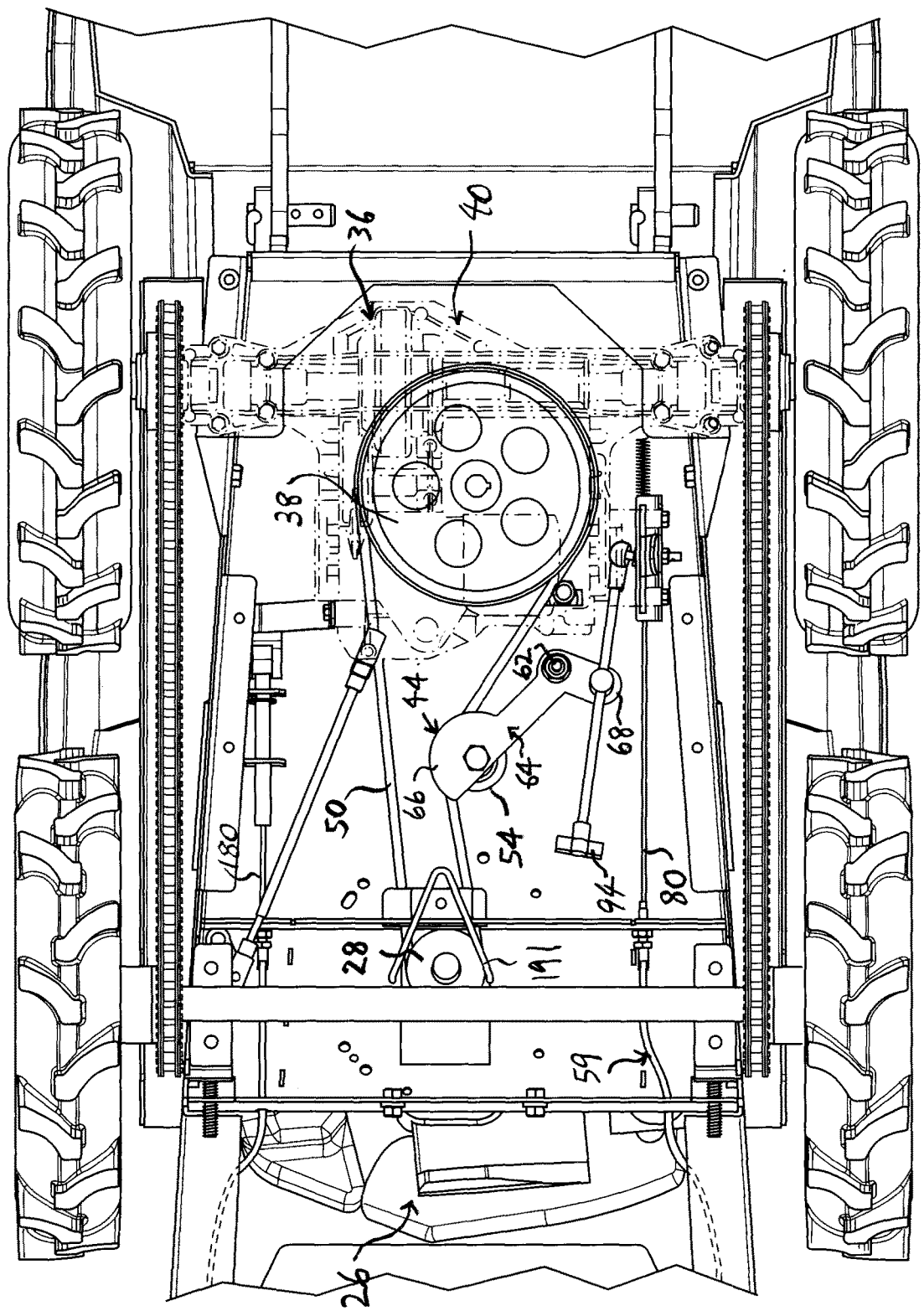
FIG. 7C is the bottom view of FIG. 7B in which a transmission subassembly is shown in dashed lines, to show a driven pulley of the drive train assembly.
Figure 7D:
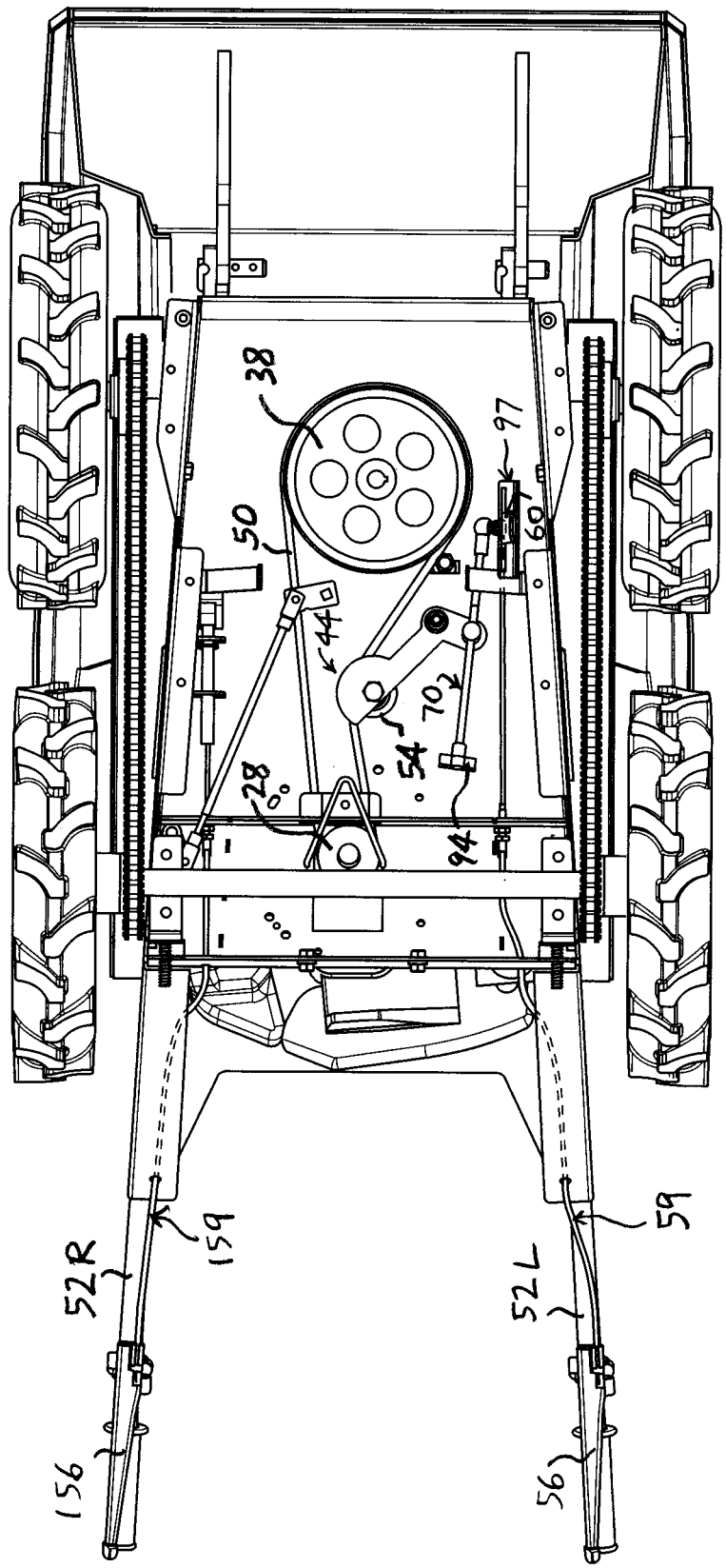
FIG. 7D is a bottom view of the motorized wheelbarrow of FIGS. 1-7B, with certain elements omitted to show an embodiment of a clutch assembly of the invention.
Figure 8A:
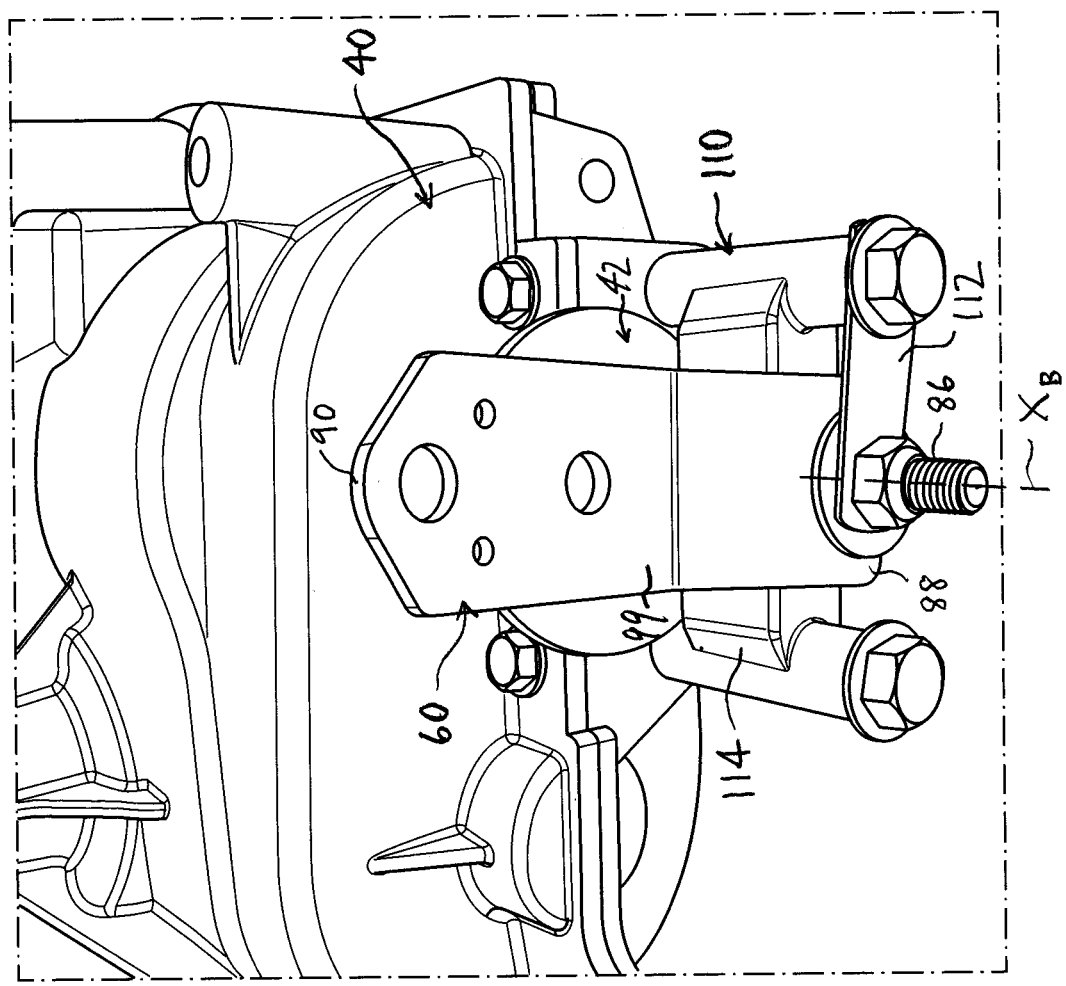
FIG. 8A is an isometric view of elements of an embodiment of a brake assembly of the invention, and a brake lever, drawn at a larger scale.

As will also be described, the motorized wheelbarrow 20 preferably also includes a drive train assembly 36, for transmitting power from the motor 26 to the wheels "$FW_1$", "$FW_2$", "$RW_1$", "$RW_2$". As can be seen in FIG. 7C, the drive train assembly 36 preferably includes a driven pulley 38 and a transmission subassembly 40, for transmitting power from the driven pulley 38 to the front axle 32. The transmission subassembly 40 preferably includes an output shaft subassembly 42 rotatable about an axis of rotation 43 thereof when the front axle 32 is rotating, as will be described (FIG. 8E).

It is also preferred that the motorized wheelbarrow 20 includes a clutch assembly 44 that is movable between a connected condition (FIGS. 7B-7E), in which the motor 26 and the drive train assembly 36 are operably connected by the clutch assembly 44 to transmit power from the motor to the wheels "$FW_1$", "$FW_2$", "$RW_1$", "$RW_2$" via the drive train assembly 36, and a disconnected condition (FIG. 7F), in which the motor 26 and the drive train assembly 36 are not operably connected with each other. It will be understood that portions of the clutch assembly 44 are shown in dashed outline in FIG. 7F for clarity of illustration.

As will also be described, the motorized wheelbarrow 20 preferably also includes a brake assembly 46 movable between an engaged condition (FIG. 8H), in which the brake assembly 46 resists rotation of the output shaft subassembly 42, and a disengaged condition (FIG. 8E), in which the brake assembly 46 permits rotation of the output shaft subassembly 42.

It will be understood that various elements are omitted from the drawings, for clarity of illustration. For example, a number of elements are omitted from FIGS. 7E and 7F, for clarity of illustration.

As can be seen in FIG. 7B, the motorized wheelbarrow 20 preferably also includes a control assembly 48 for controlling the clutch and brake assemblies 44, 46. Preferably, the clutch and brake assemblies 44, 46 are controlled by the control assembly 48 so that the brake assembly 46 is in the engaged condition thereof when the clutch assembly 44 is in the disconnected condition, and the brake assembly 46 is in the disengaged condition thereof when the clutch assembly 44 is in the connected condition thereof.

In summary, when it is in the connected condition, the clutch assembly 44 connects the motor and the drive train assembly, causing the wheels to be moved as a result, and when the clutch assembly 44 is in the disconnected condition, the motor and the drive train assembly are not connected. When the brake assembly 46 is in its engaged condition, the brake assembly resists rotation of the wheels. When the brake assembly 46 is in its disengaged condition, the brake assembly 46 does not resist rotation of the wheels. Due to the configuration of the control assembly 48 that controls the clutch and brake assemblies 44, 46, when the clutch assembly 44 is in the connected condition, the brake assembly 46 is in the disengaged condition, and when the clutch assembly 44 is in the disconnected condition, the brake assembly 46 is in the engaged condition.

In one embodiment, the brake assembly 44 preferably is biased to the engaged condition thereof, and the clutch assembly 46 is biased to the disconnected condition thereof, as will be described.

The motorized wheelbarrow 20 has the advantage that the clutch assembly 44 and the brake assembly 46 have a mutually exclusive functional relationship, as noted above. As will be described, because the clutch assembly 44 and the brake assembly 46 preferably are controlled using the same device (i.e., the control assembly 48), an operator (not shown) cannot inadvertently attempt to cause the clutch assembly 44 to be in the connected condition when the brake assembly 46 is in the engaged condition.

Those skilled in the art would appreciate that this means that it is not possible for the clutch assembly 44 to be in the connected condition at the same time as the brake assembly 46 is in the engaged condition thereof. As a result, the extent to which the components of the clutch assembly 44 and the brake assembly 46 are subjected to wear is significantly reduced, as compared to the typical prior art unit. It is believed that wear may be reduced by up to 90%, and the useful life of the clutch and brake components of the motorized wheelbarrow 20 is correspondingly longer.

Those skilled in the art would appreciate that the mutual functional exclusivity of the clutch assembly 44 and the brake assembly 46 is also a safety feature, as there is a very low risk of inadvertent movement of the clutch assembly 44 to its connected condition.

In addition, and as will also be described, because the brake assembly 46 is biased to its engaged condition, and the clutch assembly 44 is also biased to its disconnected condition, the motorized wheelbarrow 20 defaults to a condition in which the motorized wheelbarrow 20 does not move. Those skilled in the art would appreciate that this could be important in operation, e.g., if the operator happens to remove his hand from the control assembly 48, while the motorized wheelbarrow 20 is moving because the clutch assembly 44 is in its connected condition. In those circumstances, the clutch assembly 44 would immediately be in its disconnected condition, and at the same time, the brake assembly 46 would be in its engaged condition, preventing further movement of the motorized wheelbarrow 20.

In one embodiment, the clutch assembly 44 preferably includes a drive belt 50. The drive belt 50 is configured to connect the motor 26 and the drive train assembly 36. When the clutch assembly 44 is in the connected condition thereof, the drive belt 50 connects the motor 26 and the drive train assembly 36.

The drive belt 50 connects the motor 26 and the drive train assembly 36 when the drive belt 50 is engaged with the drive pulley 28 of the motor 26, and the driven pulley 38 of the drive train assembly 36 (FIG. 7C).

When the clutch assembly 44 is in the connected condition thereof, the drive belt 50 is engaged with each of the drive pulley 28 and the driven pulley 38, and the corresponding rotation of the driven pulley 38 causes the transmission subassembly 40 to use the power from the motor 26 that has been transmitted to the driven pulley 38 to rotate the front axle 32. As noted above, the output shaft subassembly 42, which is part of the transmission subassembly 40, rotates simultaneously with rotation of the front axle 32.

As noted above, when the clutch assembly 44 is in its disconnected condition, power is not transmitted from the motor 26 to the drive train assembly 36. In addition, when the clutch assembly 44 is in its disconnected condition, the brake assembly 46 is in its engaged condition.

As will be described, when the brake assembly 46 is in its engaged condition, a part thereof is activated to resist rotation of the output shaft subassembly 42. When rotation of the output shaft subassembly 42 is prevented, rotation of the front axle 32 is prevented, and in this way, the brake assembly 46 stops movement of the motorized wheelbarrow 20, when the brake assembly 46 is in its engaged condition.

It is also preferred that the control assembly 48 includes an idler pulley 54 that is movable between an urging position (FIG. 7E), in which the idler pulley 54 urges the drive belt 50 in an inward direction, to cause the drive belt 50 to connect the motor 26 and the drive train assembly 36, and a released position (FIG. 7F), in which the idler pulley 54 does not urge the drive belt 50 in the inward direction.

It will be understood that when the idler pulley 54 is in the urging position thereof (FIG. 7D), the drive belt 50 is engaged with each of the drive pulley 28 and the driven pulley 38, as a result of the engagement of the idler pulley 54 with the drive belt 50. Because the drive pulley 28 is part of the motor 26, when the motor 26 is operating, the drive pulley 28 is rotated. Accordingly, when the drive belt 50 is engaged with the drive pulley 28 and the driven pulley 38, rotation of the drive pulley 28 causes corresponding rotation of the driven pulley 38.

Figure 2A:
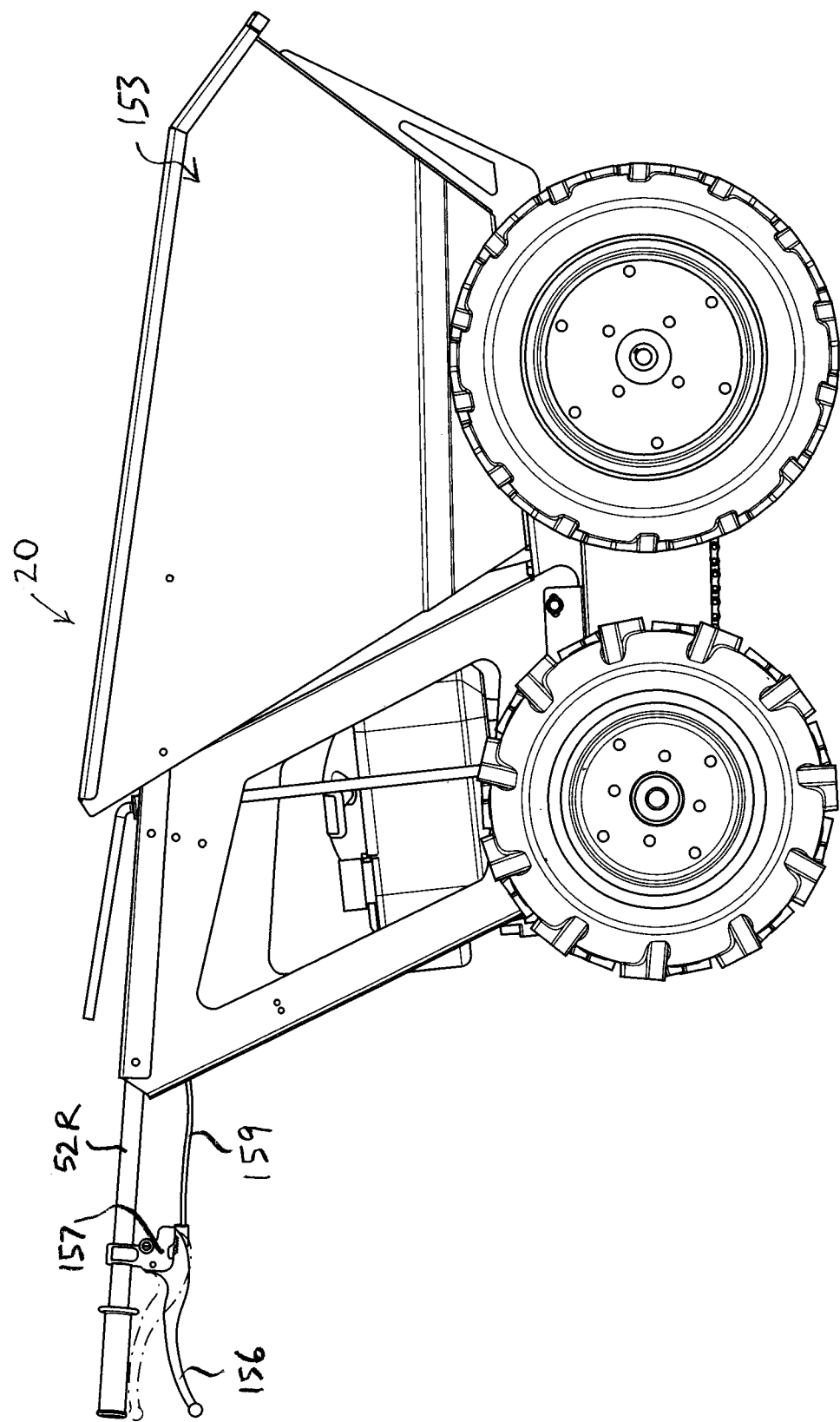
FIG. 2A is a right side view of the motorized wheelbarrow of FIG. 1 with a bucket thereof in a lowered position, drawn at a larger scale.

As can be seen in FIGS. 1, 2A, and 7B, the control assembly 48 preferably also includes a clutch lever 56, for locating the idler pulley 54 in one of the urging position and the released position, as will be described. The clutch lever 56 is located for the convenience of the operator, as will also be described. As can be seen in FIGS. 7B-7F, the control assembly 48 preferably also includes a connecting subassembly 58, for operably connecting the clutch lever 56 and the idler pulley 54.

Figure 7E:
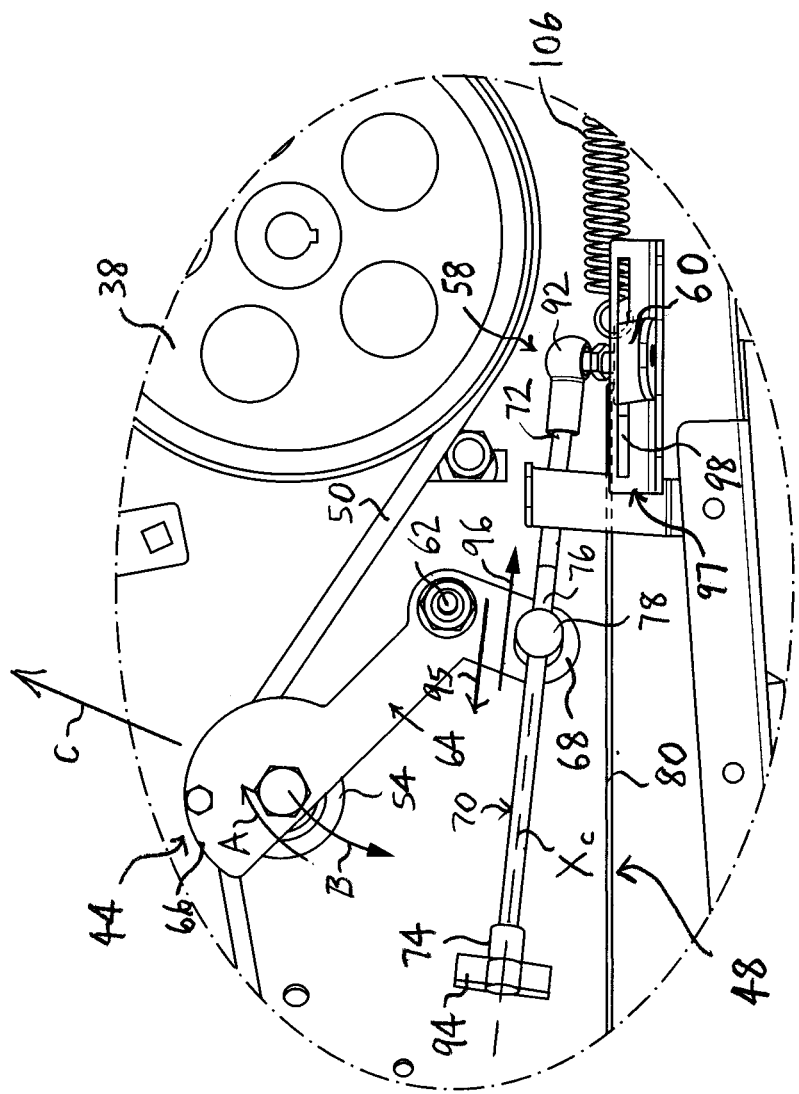
FIG. 7E is a portion of the bottom view of FIG. 7D drawn at a larger scale, to show a portion of the clutch assembly of the invention when the clutch assembly is in a connected condition thereof.

In FIG. 7E, arrow "A" indicates the direction of movement of the idler pulley 54 to the urging position thereof, and arrow "B" indicates the direction of movement of the idler pulley 54 to the released position thereof. The inward direction is generally indicated in FIG. 7E by arrow "C". When the idler pulley 54 is in the urging position, the idler pulley urges the drive belt 50 in the inward direction.

Figure 7F:
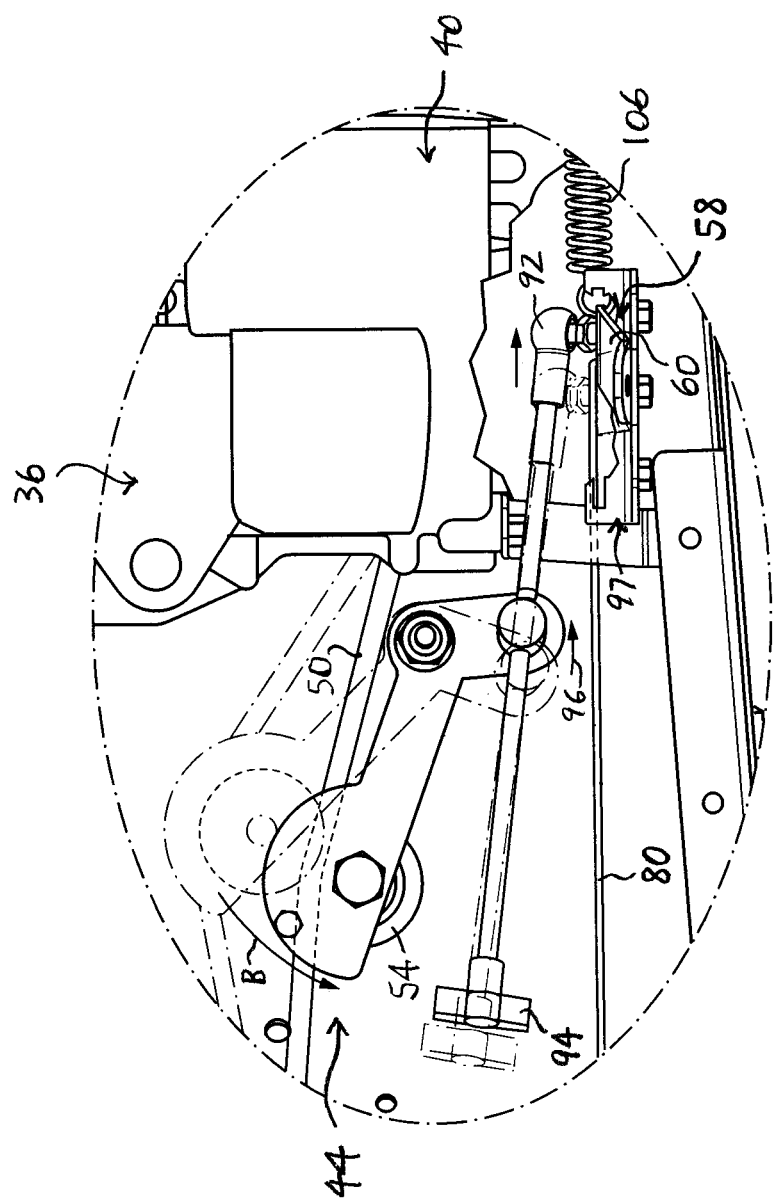
FIG. 7F is a bottom view of the clutch assembly of FIG. 7E in which the clutch assembly is in a disconnected condition thereof.

From the foregoing, it can be seen that, when the clutch assembly 44 is in the connected condition thereof, the idler pulley 54 is in the urging position thereof (FIG. 7E). Also, when the clutch assembly 44 is in the disconnected condition thereof, the idler pulley 54 is in the released position thereof (FIG. 7F).

Figure 4:
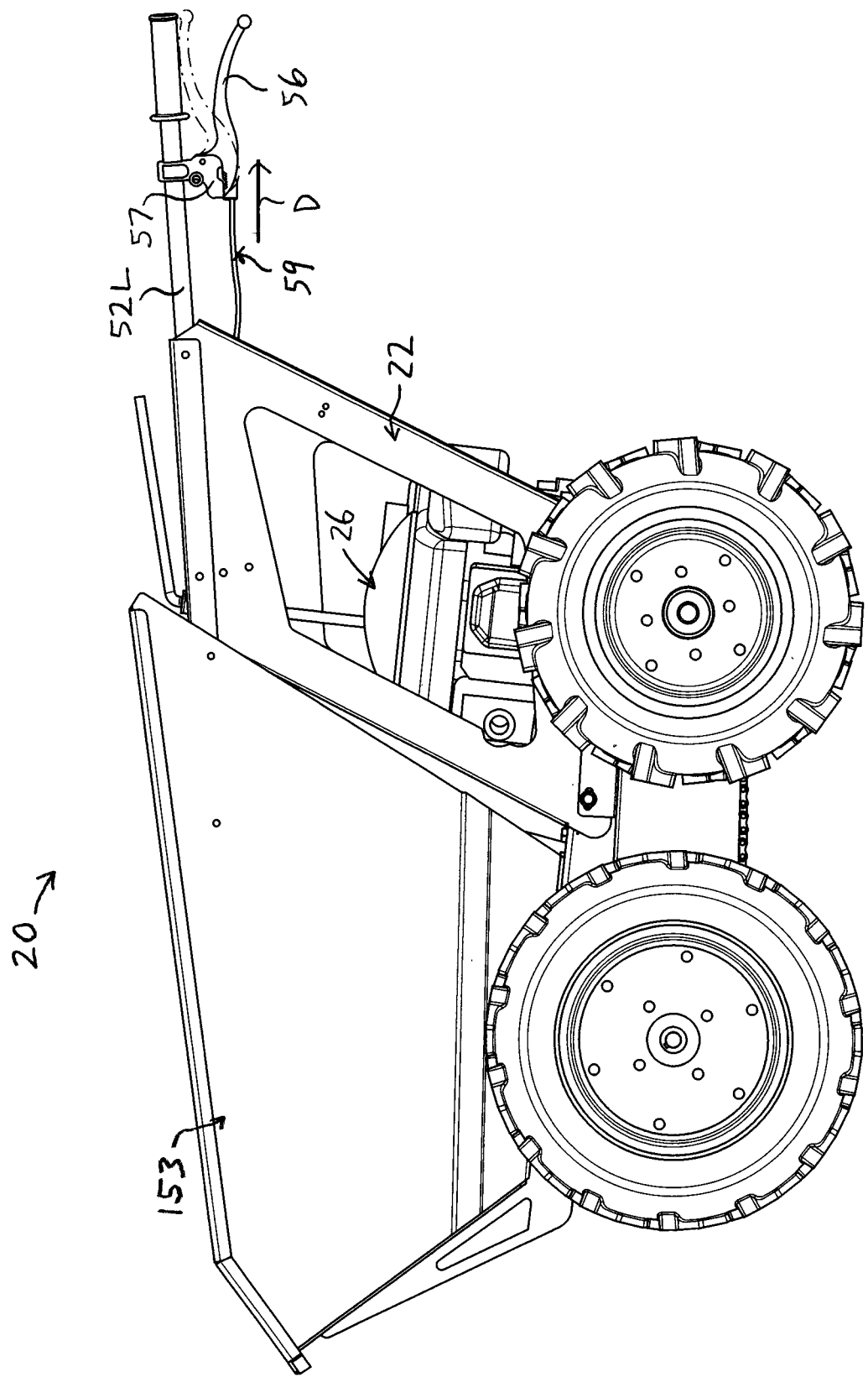
FIG. 4 is a left side view of the motorized wheelbarrow of FIGS. 1-3.

In one embodiment, the clutch lever 56 preferably is movable between a first clutch lever position (FIG. 4), in which the clutch assembly 44 is in the connected condition, and a second clutch lever position (FIG. 4), in which the clutch assembly 44 is in the disconnected condition. It will be understood that the clutch lever 56 shown in dashed outline in FIG. 4 is in the first clutch lever position, and the clutch lever 56 shown in solid outline in FIG. 4 is in the second clutch lever position.

As can be seen in FIGS. 1-2B, 4, 5, 7A, 7B, and 7D, the motorized wheelbarrow 20 preferably includes left and right handlebars 52L, 52R. Preferably, the handlebars 52L, 52R are attached to the frame assembly 22. For the convenience of the operator, the clutch lever 56 preferably is mounted on the right handlebar 52L, in a convenient location thereon.

As can be seen in FIGS. 4 and 7A-7C, the connecting subassembly 58 preferably includes a clutch cable subassembly 59. It will be understood that the clutch cable subassembly 59 may be any suitable cable. Preferably, the inner cable 80 is a braided steel cable, and the outer housing 82 is a suitably durable covering that protects the inner cable 80. The clutch cable subassembly 59 preferably includes an inner cable 80 partially located inside an outer housing or sheath 82, in which the inner cable 80 is axially movable relative to the outer housing 82. It is preferred that the clutch cable subassembly 59 extends between a first end 83 (FIG. 7B) and a second end 84 (FIG. 8B) thereof. Preferably, the first end 83 is secured to the clutch lever 56, so that movement of the clutch lever 56 from the clutch lever second position to the clutch lever first position pulls the inner cable 80 in the direction indicated by arrow "D" in FIGS. 4 and 8B.

Figure 8B:
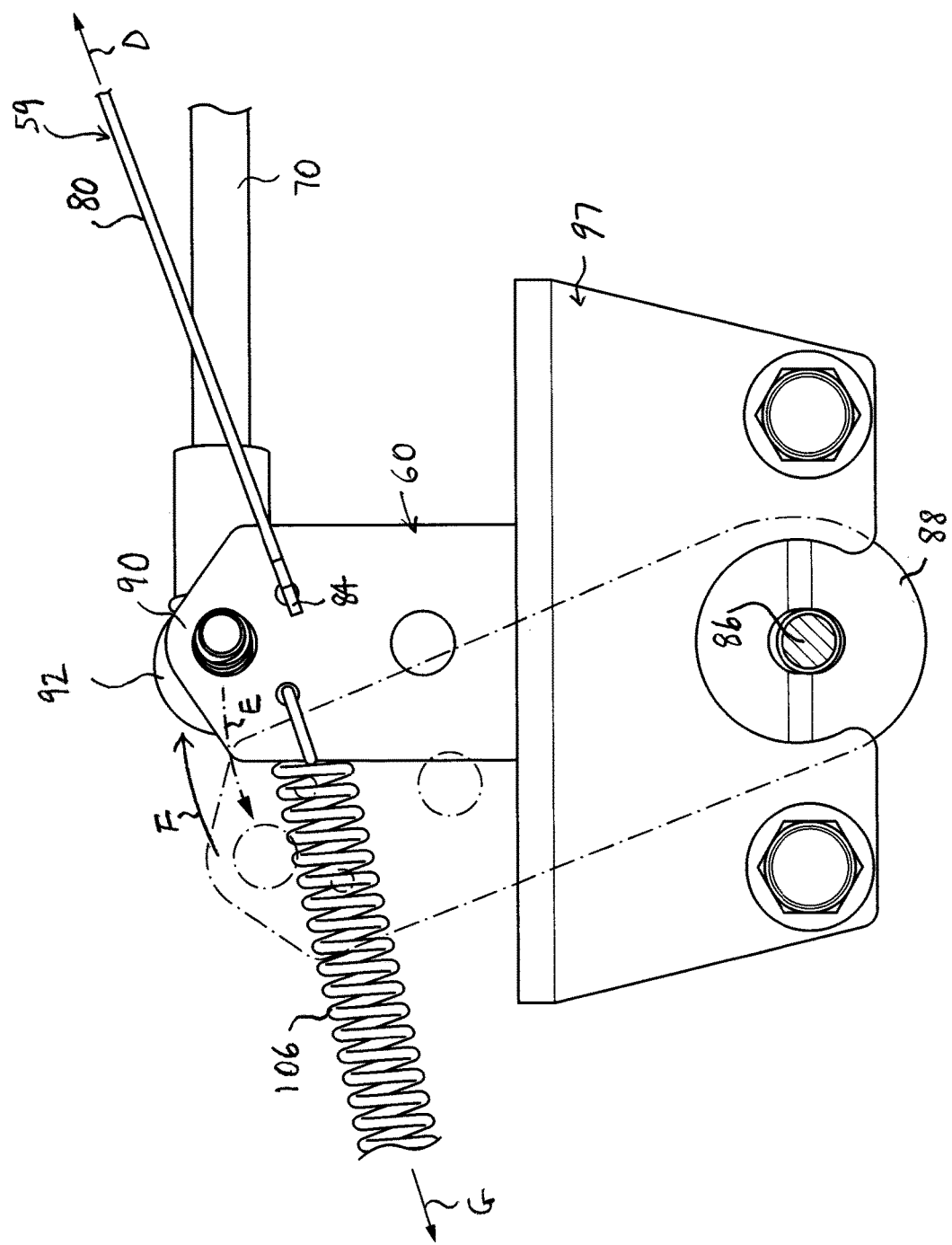
FIG. 8B is a side view of the brake assembly elements of FIG. 8A, showing the brake lever in the first and second brake lever positions.
Figure 8C:
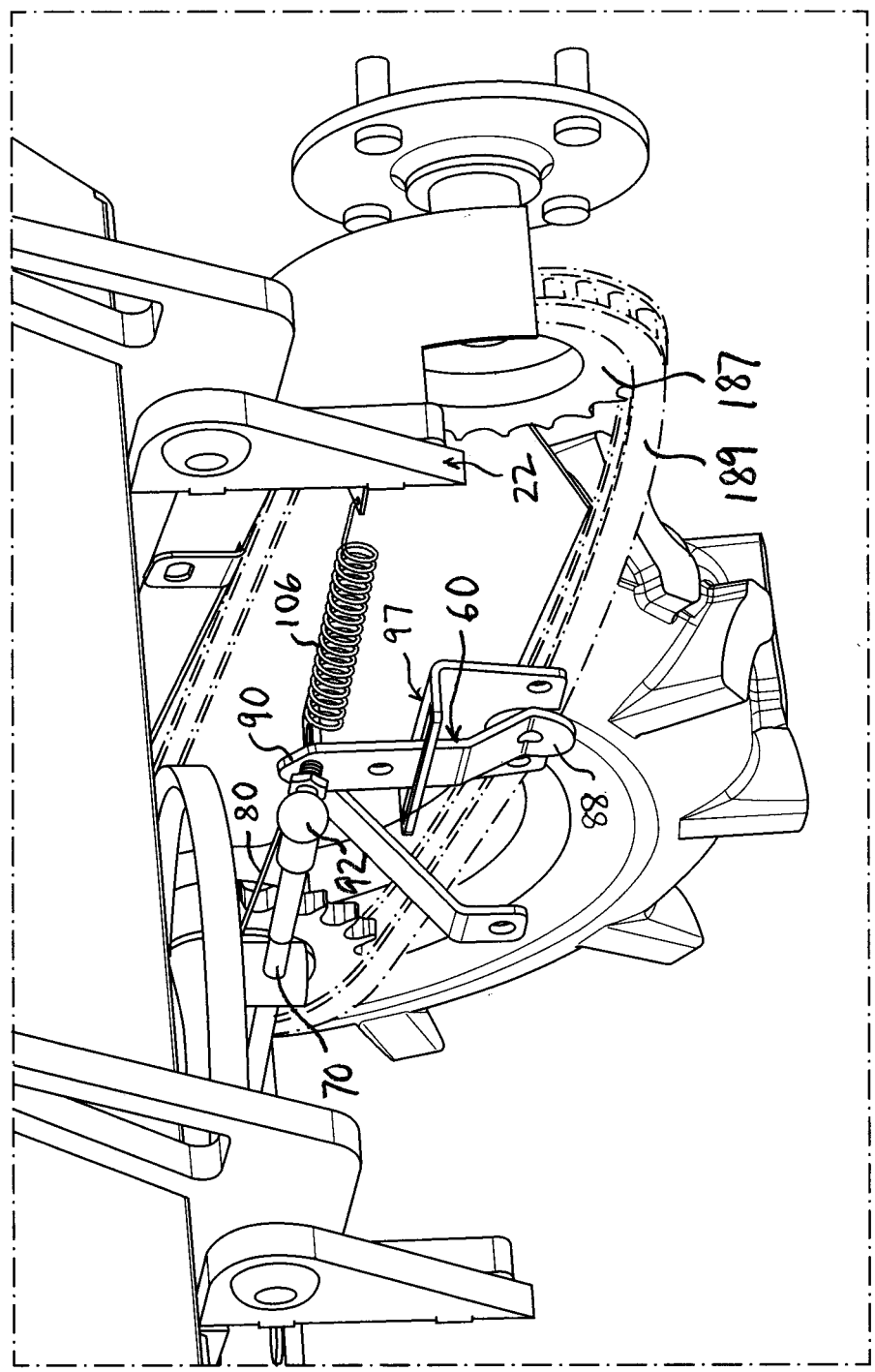
FIG. 8C is an isometric view of certain elements of the brake assembly, drawn at a smaller scale.

While the clutch lever 56 is in the clutch lever first position, the inner cable 80 is subjected to tension, and the second end 84 is pulled in the direction indicated by arrow "D" (FIG. 8B). When the clutch lever 56 is in the clutch lever second position, the inner cable 80 is not subjected to tension.

As can be seen in FIG. 4, in one embodiment, the clutch lever 56 preferably is pivotably mounted to a clutch lever bracket subassembly 57 that is secured to the left handlebar 52L. It is preferred that the clutch lever bracket subassembly 57 includes a biasing means (not shown) that biases the clutch lever 56 to the second clutch lever position. For example, the clutch lever bracket subassembly 57 may include a spring or other resilient element (not shown) that urges the clutch lever 56 to the clutch lever second position. Because those skilled in the art would be familiar with the mechanism of the clutch lever bracket subassembly, further description of the clutch lever bracket subassembly 57 is unnecessary.

In one embodiment, the connecting subassembly 58 preferably includes a brake lever 60, movable between first and second brake lever positions thereof (FIG. 8B). In FIG. 8B, the brake lever 60 is shown in the first brake lever position in solid outline, and the brake lever 60 is shown in the second brake lever position in dashed outline. As will be described, the brake lever 60 preferably is pivotable about a pivot pin 86 between the first and second brake lever positions. Preferably, the brake lever 60 extends between a lower end 88 thereof (FIGS. 8B, 8C) at which the pivot pin 86 is pivotably secured to the brake lever 60, and an upper end 90 thereof movable in the direction indicated by arrow "E" in FIG. 8B as the brake lever 60 pivots from the first brake lever position to the second brake lever position.

The upper end 90 moves in the direction indicated by arrow "F" in FIG. 8B when the brake lever 60 pivots from the second brake lever position to the first brake lever position.

As can be seen in FIG. 8B, the second end 84 of the inner cable 80 preferably is attached to the brake lever 60. Accordingly, it can be seen that, when the clutch lever 56 is moved from the second clutch lever position to the first clutch lever position, the inner cable 80 is pulled in the direction indicated by arrow "D" in FIG. 8B, to move the upper end 90 of the brake lever 60 in the direction indicated by arrow "F", from the second brake lever position to the first brake lever position.

When the clutch lever 56 is moved to the first clutch lever position, the inner cable 80 is subjected to tension, i.e., the inner cable 80 is pulled in the direction indicated by arrow "D" (FIG. 8B). When the clutch lever 56 is moved to the first clutch lever position, the inner cable 80 pulls the upper end 90 of the brake lever 60 in the direction indicated by arrow "F" in FIG. 8B, to pull the brake lever 60 from the second brake lever position to the first brake lever position. It can therefore be seen that, when the clutch lever 56 is moved to the first clutch lever position, the inner cable 80 pulls on the upper end 90 to cause corresponding movement of the brake lever 60 to the first brake lever position (FIG. 8B).

The operator may hold the clutch lever 56 in the clutch lever first position for as long as needed, e.g., for as long as necessary for the motorized wheelbarrow 20 to travel a preselected distance, as will be described. While the clutch lever 56 is held in the first clutch lever position, the brake lever 60 remains in the first brake lever position.

The connecting subassembly 58 preferably also includes an idler arm pivot pin 62, secured to the frame assembly 22, and an idler arm 64 extending between inner and outer ends 66, 68 thereof (FIGS. 7C, 7E). The idler pulley 54 is rotatably mounted on the inner end 66 (FIG. 7E). The idler arm 64 is pivotable about the idler arm pivot pin 62 between an engaged position (FIG. 7E), in which the idler pulley 54 is in the urging position thereof to tighten the drive belt 50, so that the drive belt 50 is engaged with the drive pulley 28 and the driven pulley 38, and a disengaged position (FIG. 7F), in which the idler pulley 54 is in the released position thereof.

It is also preferred that the connecting subassembly 58 includes an elongate connecting rod 70 defined by a connecting rod axis "$X_C$" thereof (FIG. 7E). The connecting rod 70 preferably extends between a first end 72, at which the connecting rod 70 is connected with the brake lever 60, and a second end 74. Preferably, the connecting rod 70 also includes an intermediate segment 76 located between the first and second ends 72, 74. As can be seen in FIG. 7E, the connecting subassembly 58 preferably also includes a fastener element 78 located on the outer end 68 of the idler arm 64. As will be described, the fastener element 78 preferably engages the intermediate segment 76 to secure the connecting rod 70 to the outer end of the idler arm 64.

From the foregoing, it can be seen that the brake lever 60 is positioned in the first brake lever position thereof when the clutch lever 56 is in the first clutch lever position. As can be seen in FIG. 7E, when the brake lever 60 is in the first brake lever position, the brake lever 60 locates the connecting rod 70 to position the idler pulley 54 in the urging position thereof, pushing inwardly against the drive belt 50.

The first end 72 of the connecting rod 70 may be attached to the upper end 90 of the brake lever 60 in any suitable manner. In one embodiment, the connecting subassembly 58 preferably additionally includes a ball joint fitting 92 connecting the first end 72 of the connecting rod 70 and the brake lever 60. As will also be described, the ball joint fitting 92 is preferred because it can accommodate small changes in the position of the connecting rod 70 relative to the brake lever 60.

It is preferred that the fastener element 78 and the intermediate segment 76 of the connecting rod 70 are threadably engaged. As described in more detail below, rotation of the connecting rod 70 about the connecting rod axis "$X_C$" causes the position of the inner end 66 relative to the ball joint fitting 92 to be changed, to adjust the engaged position of the idler arm 64 relative to the drive belt 50.

Due to the threadable engagement of the intermediate portion 76 with the fastening element 78, by rotating the connecting rod 70 about its axis "$X_C$", the position of the idler pulley 54 relative to the drive belt 50 can be adjusted. Those skilled in the art would appreciate that the adjustment may be a relatively fine adjustment. In this way, the tension to which the drive belt 50 is subjected by the idler pulley 54 can be adjusted, e.g., to accommodate wear on the drive belt 50. Alternatively, if the idler pulley 54 is pushing too hard on the drive belt 50, then the tension caused by the engagement of the idler pulley 54 with the drive belt 50 can be relaxed, by rotating the connecting rod 70 about its axis "$X_C$", causing the fastening element 78 to move in the direction indicated by arrow 96 in FIG. 7E.

For example, if it is intended to subject the drive belt 50 to increased tension, a handle 94 at the second end 74 of the connecting rod 70 is rotated by the operator, to rotate the connecting rod 70 about its axis "$X_C$", so as to cause the fastening element 78 and the outer end 68 to move in the direction generally indicated by arrow 95 in FIG. 7E. When this happens, the idler arm 64 pivots about the pivot pin 62, causing the inner end 66 to pivot in the direction indicated by arrow "A", thereby moving the idler pulley 54 in the direction generally indicated by arrow "C" in FIG. 7E. It will be understood that the first end 72 preferably is held in the ball joint fitting 92 to accommodate rotation of the connecting rod 70 relative to the ball joint fitting 92, without causing rotation of the ball joint fitting 92. The ability to adjust the position of the idler arm 64 relative to the drive belt 50 is another important feature of the invention herein. In particular, the connecting rod 70 is configured so that the handle 94 is conveniently located for the operator, as will be described.

As can be seen in FIG. 7A, in one embodiment, the motorized wheelbarrow 20 preferably includes plates "$P_1$", "$P_2$", to protect the components that they respectively cover. It can be seen in FIGS. 7A and 7B that the plate "$P_1$" generally covers the transmission subassembly 40, part of the clutch assembly 44, and part of the drive belt 50. The plate "$P_2$" generally covers part of the drive belt 50 and also provides protection to the motor 26, and in particular the drive pulley 28. It will be understood that the plates "$P_1$", "$P_2$" are omitted from FIGS. 7B-7F, for clarity of illustration.

It can be seen in FIG. 7A that, due to the configuration of the connecting rod 70, the handle 94 is not covered by the plates "$P_1$", "$P_2$". Importantly, the operator has access to the handle 94 without having to remove or loosen any elements of the motorized wheelbarrow 20. Those skilled in the art would appreciate that, as a practical matter, while the motorized wheelbarrow is in use, the operator may not have tools readily available. If the operator determines that an adjustment of the clutch assembly 44 is needed, however, the operator may make the adjustment quickly and efficiently, without having to remove any elements of the motorized wheelbarrow. Accordingly, this feature is important because it facilitates timely adjustment of the clutch assembly 44, which will ultimately result in a longer useful life of the clutch assembly 44.

As described above, when the clutch assembly 44 is in the connected condition, the brake assembly 46 is in the disengaged condition thereof. Similarly, when the clutch assembly 44 is in the disconnected condition, the brake assembly 46 is in the engaged condition thereof. The mutual functional exclusivity of the clutch assembly 44 and the brake assembly 46 provides the significant advantage that the wear to which the elements of the clutch assembly 44 and the elements of the brake assembly 46 are subjected is much reduced, as compared to the prior art, and the clutch assembly 44 and the brake assembly 46 each have a longer useful life as a result. It will be understood that the functionally mutually exclusive relationship of the clutch and brake assemblies 44, 46 is due to the manner in which the clutch and brake assemblies 44, 46 are controlled by the control assembly 48, as will be described.

As can be seen in FIGS. 8B-8F, the control assembly 48 preferably includes a guide bracket 97 for partially guiding the brake lever 60 as it moves between the brake lever first position and the brake lever second position. Preferably, the guide bracket 97 includes a slot 98 therein in which an intermediate portion 99 of the brake lever 60 loosely fits. As can be seen in FIG. 8A, the intermediate portion 99 is located between the lower end and the upper end 88, 90 of the brake lever 60. When the brake lever 60 moves between the first and second brake lever positions, the intermediate portion 99 of the brake lever 60 is guided in the slot 98 so that the movement of the intermediate portion 99 is orthogonal, or substantially orthogonal, to an axis of rotation "$X_B$" of the brake lever 60 defined by the pivot pin 86 (FIG. 8A). It will be understood that the guide bracket 97 is omitted from FIG. 8A for clarity of illustration.

Figure 8D:
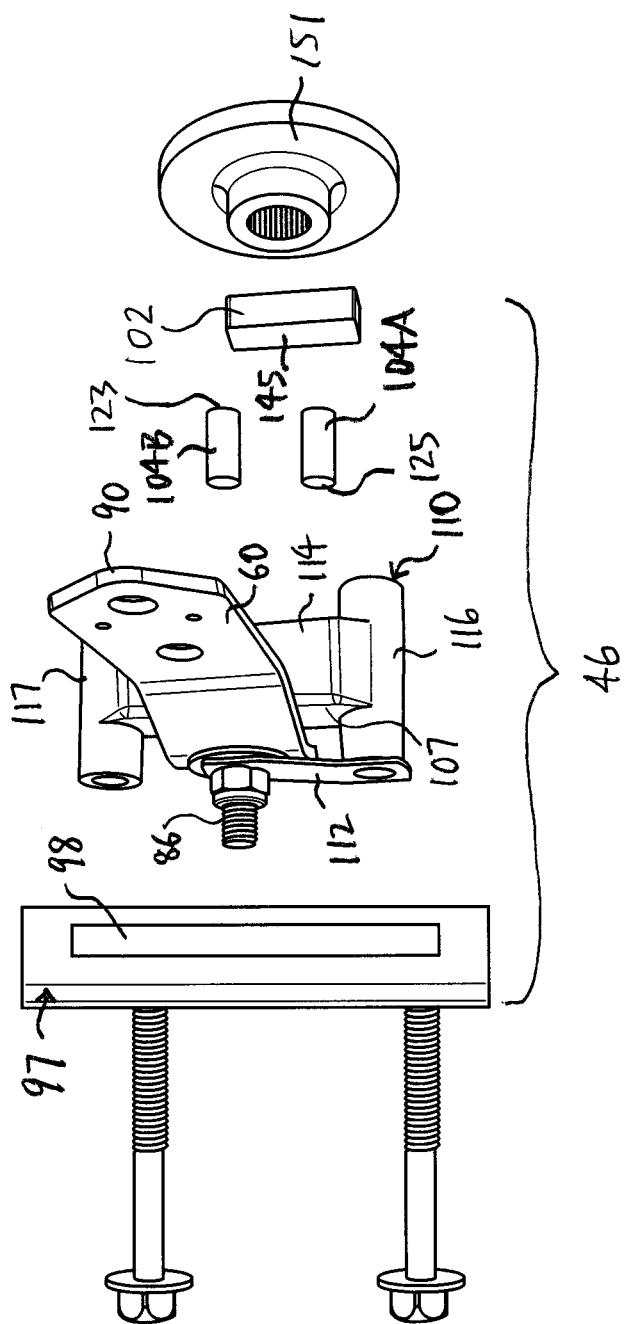
FIG. 8D is an exploded view of certain elements of the brake assembly.
Figure 8E:
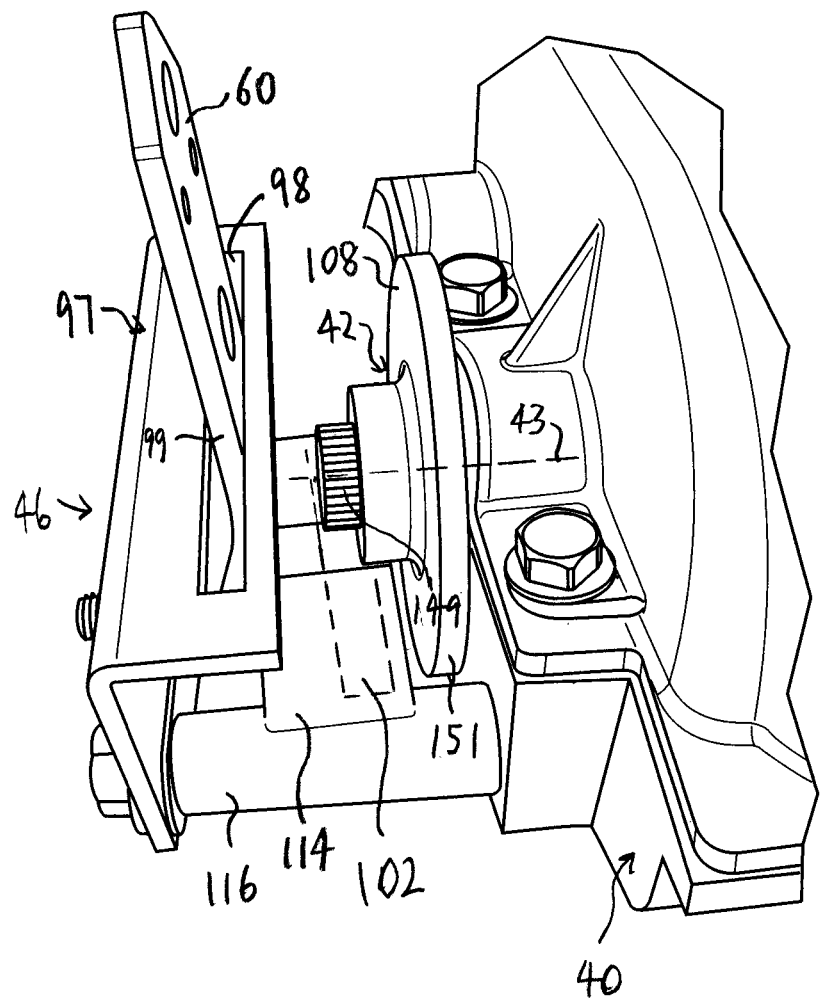
FIG. 8E is an isometric view of elements of the brake assembly positioned for engagement with the output shaft subassembly of the transmission subassembly.
Figure 8F:
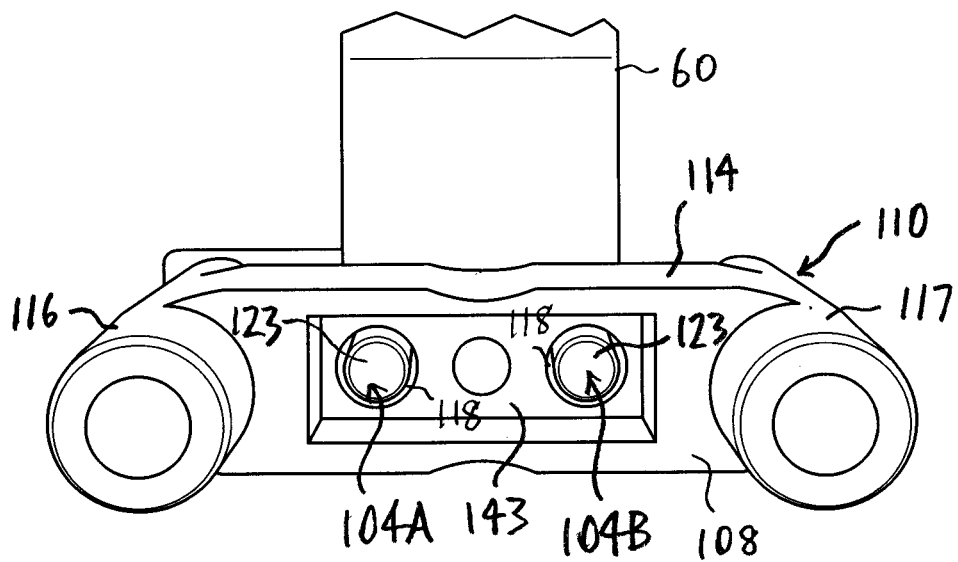
FIG. 8F is a side view of a support bracket with brake pins therein in the first brake pin position, and the brake lever in the first brake lever position.
Figure 8G:
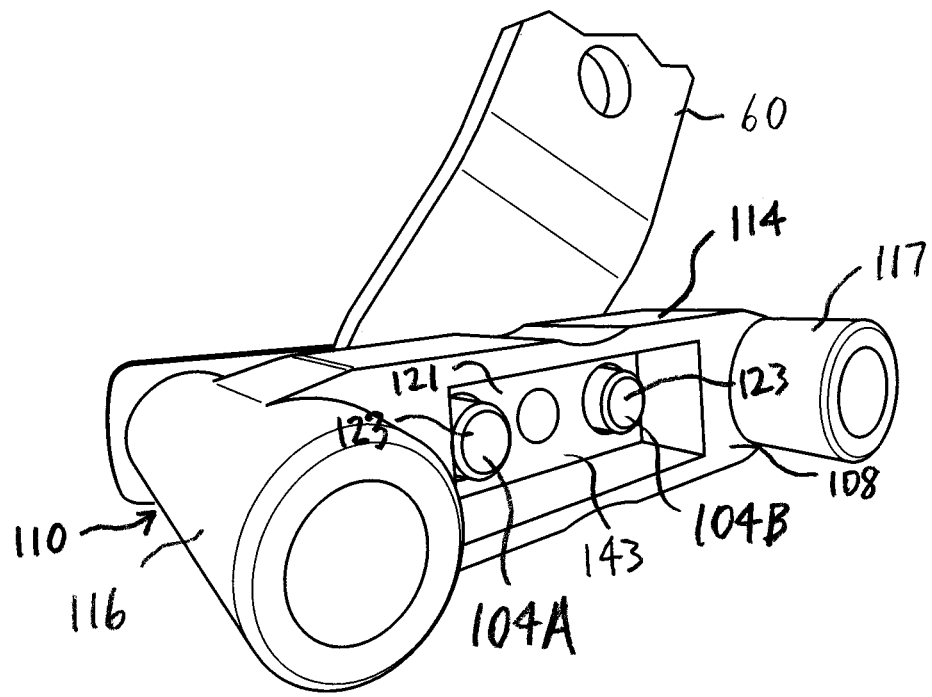
FIG. 8G is an isometric view of the support bracket of FIG. 8F in which the brake lever is in the second brake lever position and the brake pins are in the second brake pin position.
Figure 8H:
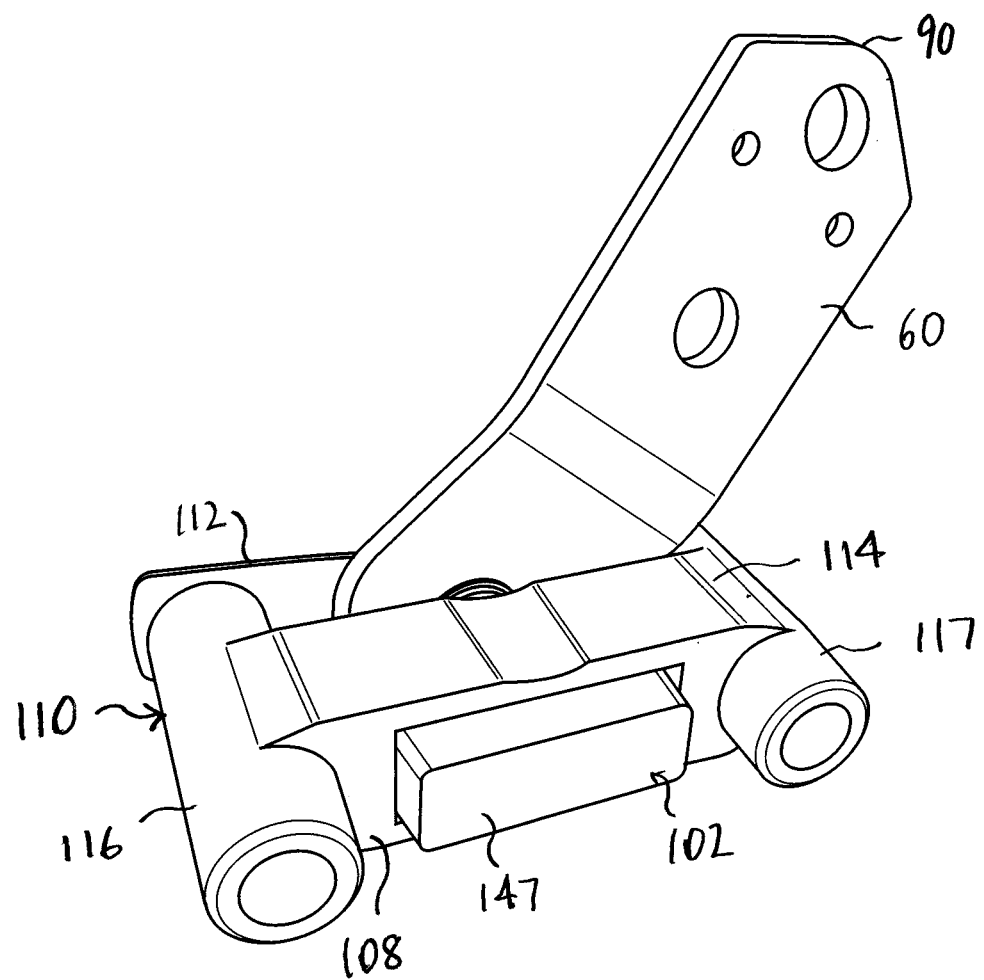
FIG. 8H is an isometric view of the support bracket of FIGS. 8F and 8G in which the brake lever is in the second brake lever position.

In one embodiment, the brake assembly 46 preferably includes one or more brake shoes 102 (FIGS. 8D, 8H). As will be described, the brake shoe 102 preferably is movable between a second position (FIG. 8H, 8K), in which the brake shoe 102 is engaged with the output shaft subassembly 42 to resist rotation of the output shaft subassembly 42, and a first position (FIG. 8E), in which the brake shoe 102 is not urged against the output shaft subassembly 42.

It is also preferred that the brake assembly 46 includes one or more brake pins. As can be seen in FIGS. 8F, 8G, it is preferred that the brake assembly 46 includes two brake pins 104A, 104B. The brake pins 104A, 104B preferably are movable between a second brake pin position (FIG. 8G), in which the brake pins 104A, 104B urge the brake shoe 102 against the output shaft subassembly 42 for resisting rotation of the output shaft subassembly 42, and a first brake pin position (FIG. 8F), in which the brake pins 104A, 104B do not urge the brake shoe 102 against the output shaft subassembly 42.

As will be described, the brake lever 60 preferably is formed to move the brake pins 104A, 104B from the first brake pin position to the second brake pin position, to push the brake pins 104A, 104B against the brake shoe 102, when the brake lever 60 is moved to the second brake lever position.

As can be seen in FIGS. 7F and 8B, the control assembly 48 preferably also includes a brake lever spring 106 for biasing the brake lever 60 to the second brake lever position. The spring 106 pulls in the direction indicated by arrow "G" in FIG. 8B, so that the spring 106 pulls the upper end 90 of the brake lever 60 in the direction indicated by arrow "E" in FIG. 8B until the brake lever 60 is in the second brake lever position.

As can be seen in FIG. 8B, the brake lever 60 pivots from the second brake lever position to the first brake lever position when the clutch lever 56 is moved from the second clutch lever position to the first clutch lever position.

When the clutch lever 56 is moved to the clutch lever first position, the inner cable 80 is pulled in the direction indicated by arrow "D" in FIG. 8B, pulling the upper end 90 of the brake lever 60 in the direction indicated by arrow "F" until the brake lever 60 is in the first brake lever position. Those skilled in the art would appreciate that, in order to accomplish this, the tension to which the inner cable 80 is subjected when the clutch lever 56 is moved to the first clutch lever position must be sufficient to overcome the force in the direction indicated by arrow "G" to which the upper end 90 is subjected by the spring 106. Those skilled in the art would also appreciate that, due to the arrangement illustrated in FIG. 8B, the default position of the brake lever (i.e., the position of the brake lever when the inner cable 80 is not pulled in the direction indicated by arrow "D") is the second brake lever position.

In one embodiment, the brake assembly 46 preferably includes a support bracket 110 and an arm element 112 mounted to the support bracket 110 (FIGS. 8A, 8D). The pivot pin 86 is held in place by the arm element 112, to permit pivoting movement of the upper end 90 of the brake lever 60 about the axis of rotation "$X_B$" as the brake lever 60 moves between the first and second brake lever positions. The pivot pin 86 is attached to the arm element 112 and holds the brake lever 60 in place by any suitable fastening means that permits rotation of the brake lever 60 about the axis of rotation "$X_B$".

Preferably, the support bracket 110 includes a body 114 and end portions 116, 117 for fastening the support bracket 110 to the transmission subassembly 40. As can be seen in FIGS. 8D, 8F-8I, the body 114 preferably has an outer side 107, proximal to the brake lever 60, and an inner side 108. When the support bracket 110 is mounted to the transmission subassembly 40, the inner side 108 faces the output shaft subassembly 42 (FIG. 8E).

As can be seen in FIGS. 8F and 8G, in one embodiment, the brake pins 104A, 104B preferably are positioned in holes 118 in the body 114 of the support bracket 110. It is also preferred that the body 114 includes a recess 121 in which the holes 118 are located, in which the brake pins 104A, 104B are received. The recess 121 is partially defined by an inner wall 143, in which the holes 118 are located. The brake pins 104A, 104B each extend between an inner end 123 thereof and an outer end 125 thereof (FIG. 8D).

In one embodiment, the brake lever 60 preferably includes one or more camming surfaces 129, 135 that engage the brake pins 104A, 104B as the brake lever 60 pivots from the first brake lever position to the second brake lever position. The camming surfaces 129, 135 disengage from the brake pins 104A, 104B when the brake lever 60 pivots from the second brake lever position to the first brake lever position.

Figure 8I:
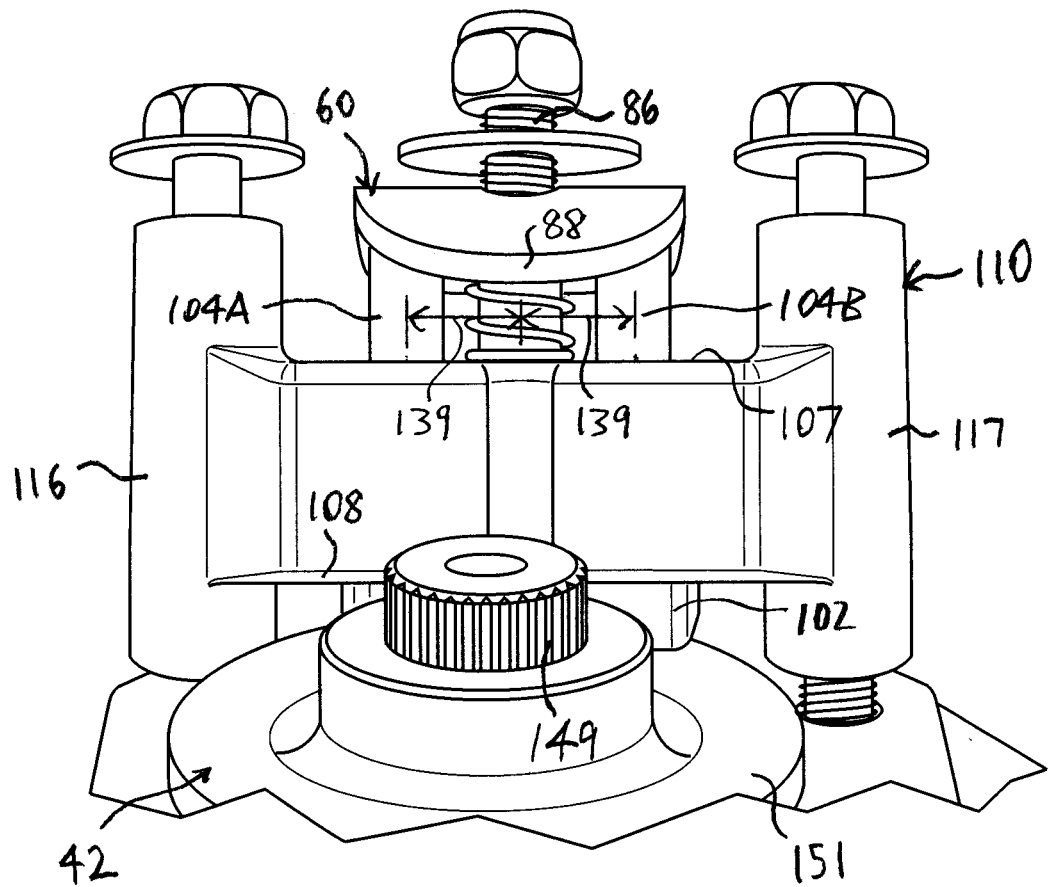
FIG. 8I is a bottom side view of elements of the brake assembly in relation to the transmission subassembly.
Figure 8J:
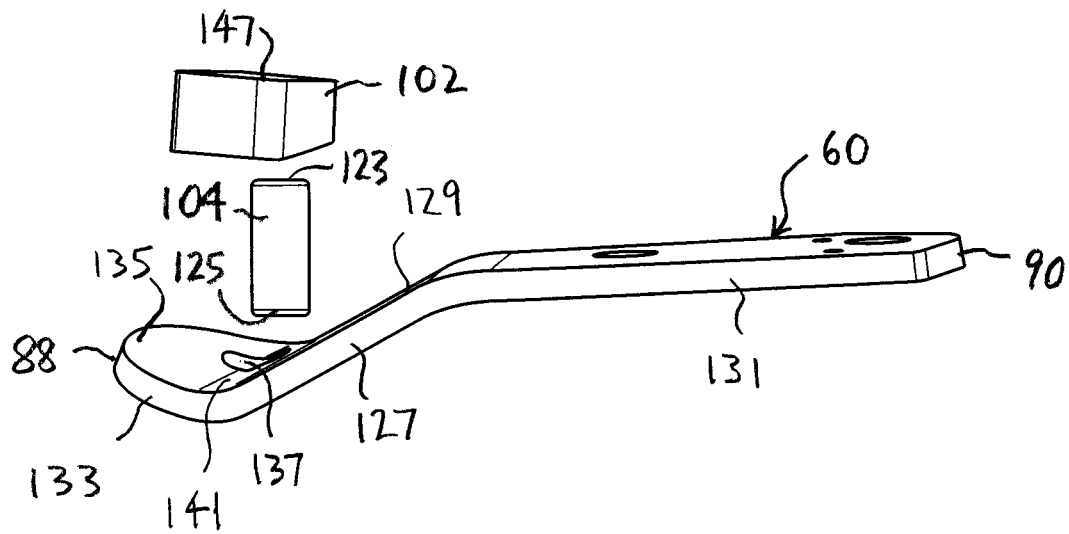
FIG. 8J is an exploded view showing the brake lever, a brake pin, and a brake shoe.

Preferably, the brake lever 60 includes a camming portion 127 that defines the first camming surface 129 (FIG. 8J). As can be seen in FIG. 8J, the camming portion 127 preferably is located between an upper portion 131 and a slightly curved lower portion 133. Preferably, the lower portion 133 also includes the second camming surface 135, at the lower end 88 of the brake lever. The brake lever 60 also includes an aperture 137 at least partially located in the lower portion 133, in which the pivot pin 86 is receivable.

For clarity of illustration, only one brake pin is shown in FIG. 8J, identified by reference numeral 104. It will be understood that, in FIG. 8J, the brake lever 60, the brake pin 104, and the brake shoe 102 are positioned relative to each other as they are when assembled with the support bracket 110 and when the brake lever 60 is in its first position (FIG.

8I). In particular, it can be seen in FIG. 8J that the outer end 125 of the brake pin 104 is located proximal to a boundary region 141 of the brake lever 60, which is located between the first and second camming surfaces 129, 135. As can be seen in FIG. 8J, the boundary region 141, in which the aperture 137 is located, is recessed relative to each of the first and second camming surfaces 129, 135.

Due to the configuration of the first and second camming surfaces 129, 135, each of those surfaces is closer to the outer side 107 of the body 114 of the support bracket 110. When the brake lever 60 is in the first brake lever position, however, each of the first and camming surfaces 129, 135 is vertically offset relative to the outer ends 125 of the brake pins 104A, 104B. When the brake lever 60 is in the first brake lever position, the outer ends 125 are located proximal to the boundary region 141 of the brake lever 60, which is recessed relative to the first and second camming surfaces 129, 135.

When the brake lever 60 is in the first brake lever position (FIGS. 8I, 8J), the two brake pins 104A, 104B are also in their respective first brake pin positions. It will be understood that when the two brake pins 104A, 1048 are in their first brake pin positions, the inner ends 123 thereof are located proximal to the inner wall 143 (FIG. 8F). The brake pins 104A, 104B are shown in their second brake pin positions in FIG. 8G, in which the inner ends 123 thereof are located a distance inwardly from the inner wall 143. It will also be understood that the brake shoe 102 is omitted from FIGS. 8F and 8G for clarity of illustration.

As can be seen in FIG. 8I, in which the brake lever 60 is in the first brake lever position and the brake pins 104A, 104B are in their respective first brake pin positions, the brake pins 104A, 104B are each preferably offset from the pivot pin 86 by a predetermined horizontal distance 139. As noted above, when the brake lever 60 is in the first brake lever position (FIG. 8I), the outer ends 125 of each of the brake pins 104A, 104B are positioned proximal to the boundary region 141 of the brake lever 60 (FIG. 8J). Accordingly, when the brake lever 60 is pivoted to the second brake lever position, the first and second camming surfaces 129, 135 engage the outer ends 125 of the brake pins 104A, 104B, and push on the outer ends 125, to move the brake pins 104A, 104B from their first brake pin position to the second brake pin position.

When the brake lever 60 is moved from the first brake lever position to the second brake lever position, the outer end 125 of the brake pin 104A is engaged and pushed inwardly by the second camming surface 135, and the outer end 125 of the brake pin 104B is engaged and pushed inwardly by the first camming surface 129 (FIGS. 8F, 8G).

The brake shoe 102 has an outer side 145 (FIG. 8D) that is engaged by the inner ends 123 of the brake pins 104A, 104B when the brake pins 104A, 104B are moved to their respective second brake pin positions. Accordingly, when the brake pins 104A, 104B are moved to their respective second brake pin positions, the brake shoe 102 is urged by the brake pins 104A, 104B against the output shaft subassembly 42, to resist rotation of the output shaft subassembly 42 about the axis of rotation 43 thereof. While the brake lever 60 is in the second brake lever position, the second and first camming surfaces 135, 129 of the brake lever 60 continue to urge the brake pins 104A, 104B respectively against the outer side 145 of the brake shoe 102. From the foregoing, it can be seen that, while the brake lever 60 is in the second brake lever position, the brake shoe 102 is urged against the output shaft subassembly 42, to resist rotation of the output shaft subassembly 42 about the axis of rotation 43.

Figure 8K:
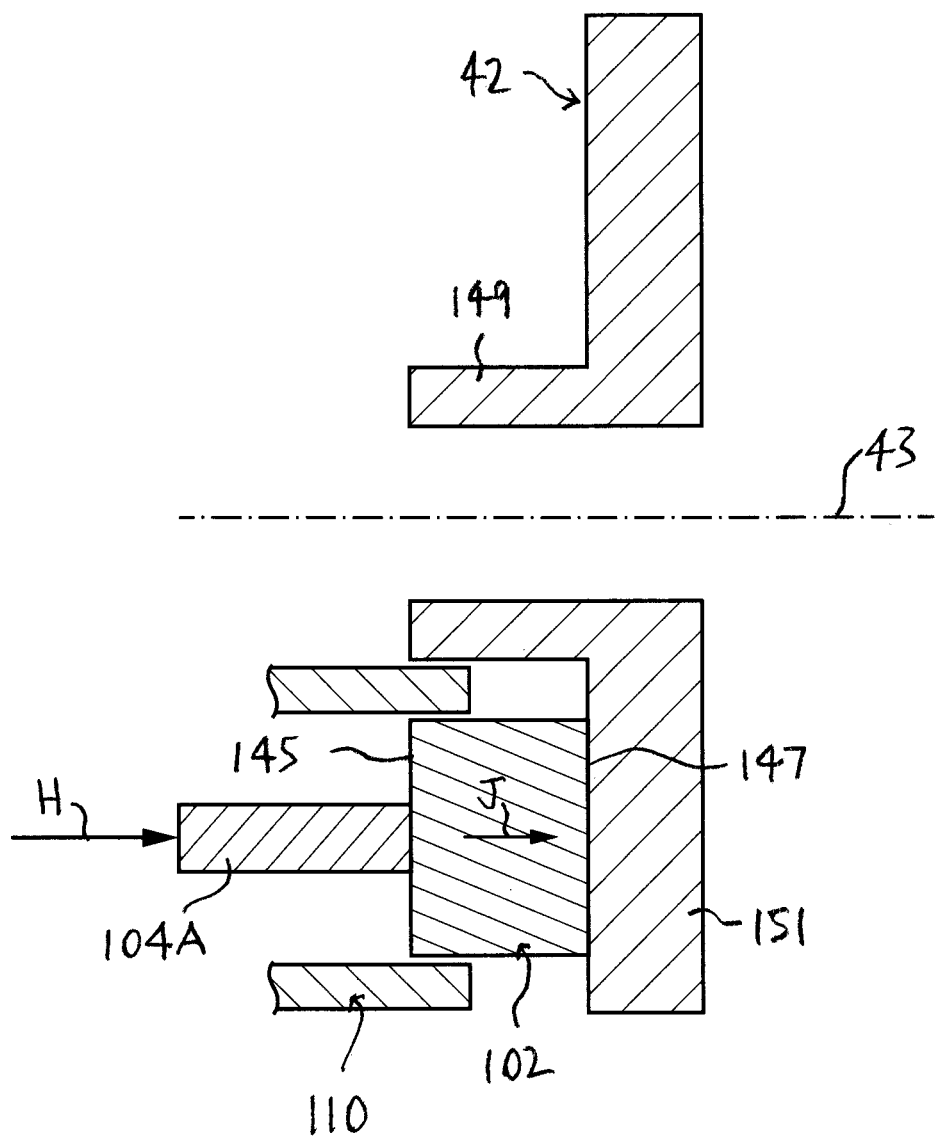
FIG. 8K is a cross-section showing the brake shoe urged against the output shaft subassembly, drawn at a larger scale.

The brake shoe 102 includes an inner side 147 that is engaged with the output shaft subassembly 42, when the brake pins 104A, 104B are in their respective second brake pin positions (FIG. 8K). In FIG. 8K, the pressure exerted on the outer ends of the brake pins 104A, 104B by the brake lever 60 in the second brake lever position is schematically represented by arrow "H", and the corresponding pressure exerted on the outer side 145 of the brake shoe 102 to urge the inner side 147 against the output shaft subassembly 42 is schematically represented by arrow "J".

In one embodiment, the output shaft subassembly 42 preferably includes an output shaft 149 and a flange element 151 secured to the output shaft 149. Because of this arrangement, the inner side 147 of the brake shoe 102 may be, as illustrated, generally flat. Due to friction, the inner side 147 is subjected to wear, and therefore the brake shoe 102 is relatively easily replaced.

It will be understood that, when the brake lever 60 moves from the second brake lever position to the first brake lever position, the first and second camming surfaces 129, 135 are disengaged from the outer ends 125 of the brake pins 104A, 104B. Accordingly, at that point the brake lever 60 ceases to urge the brake pins 104A, 104B inwardly, against the outer side 145 of the brake shoe 102.

Figure 2B:
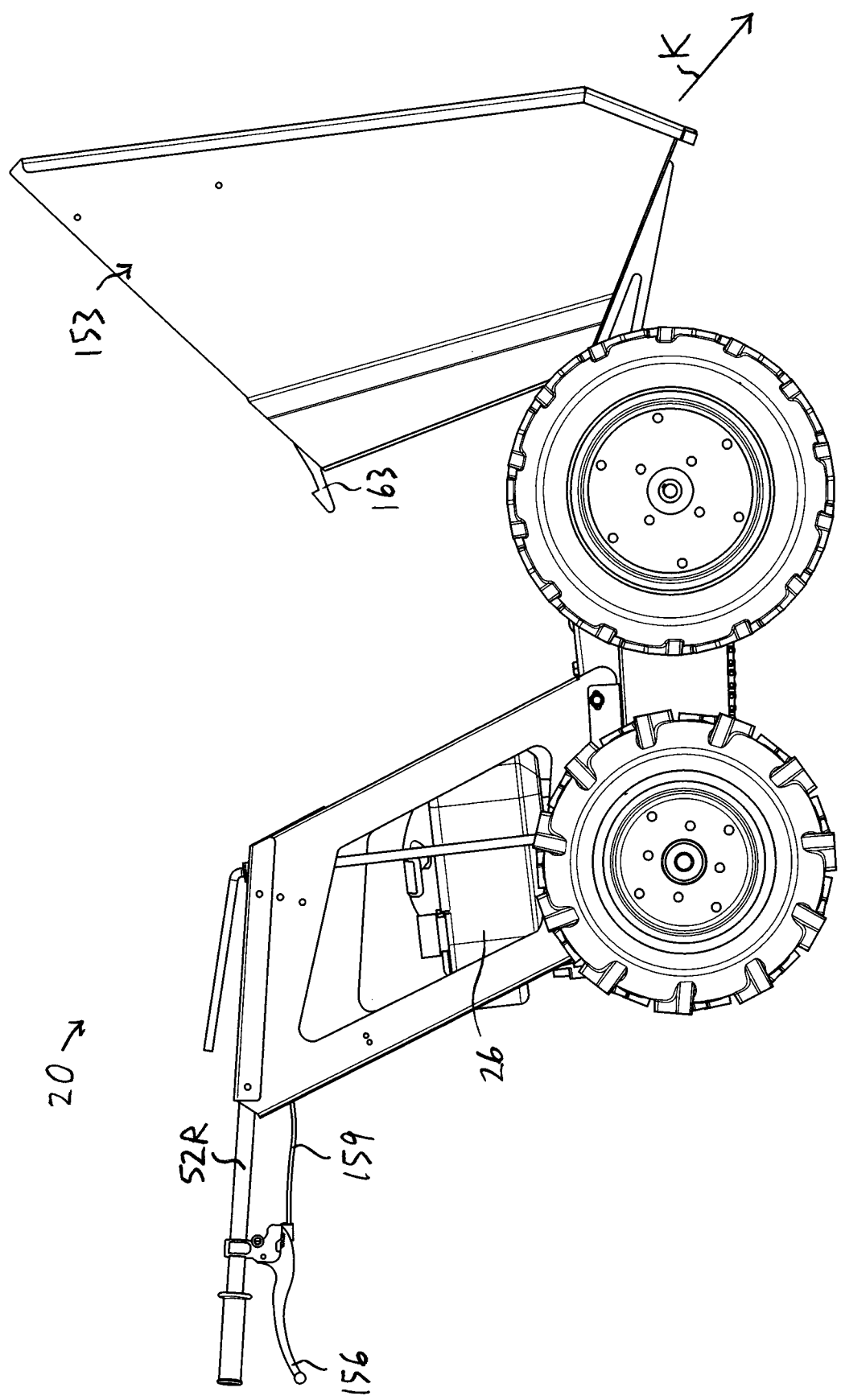
FIG. 2B is a side view of the motorized wheelbarrow of FIG. 2A with the bucket in the raised position.
Figure 3:
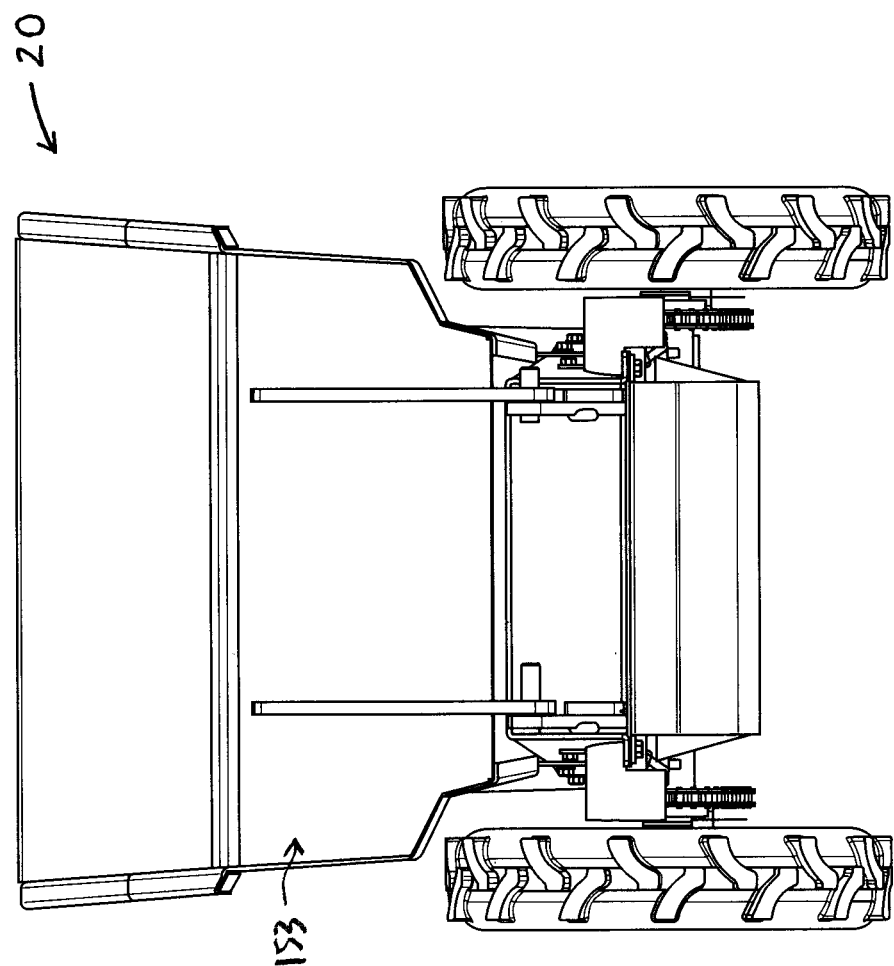
FIG. 3 is a front side view of the motorized wheelbarrow of FIGS. 1-2B.
Figure 5:
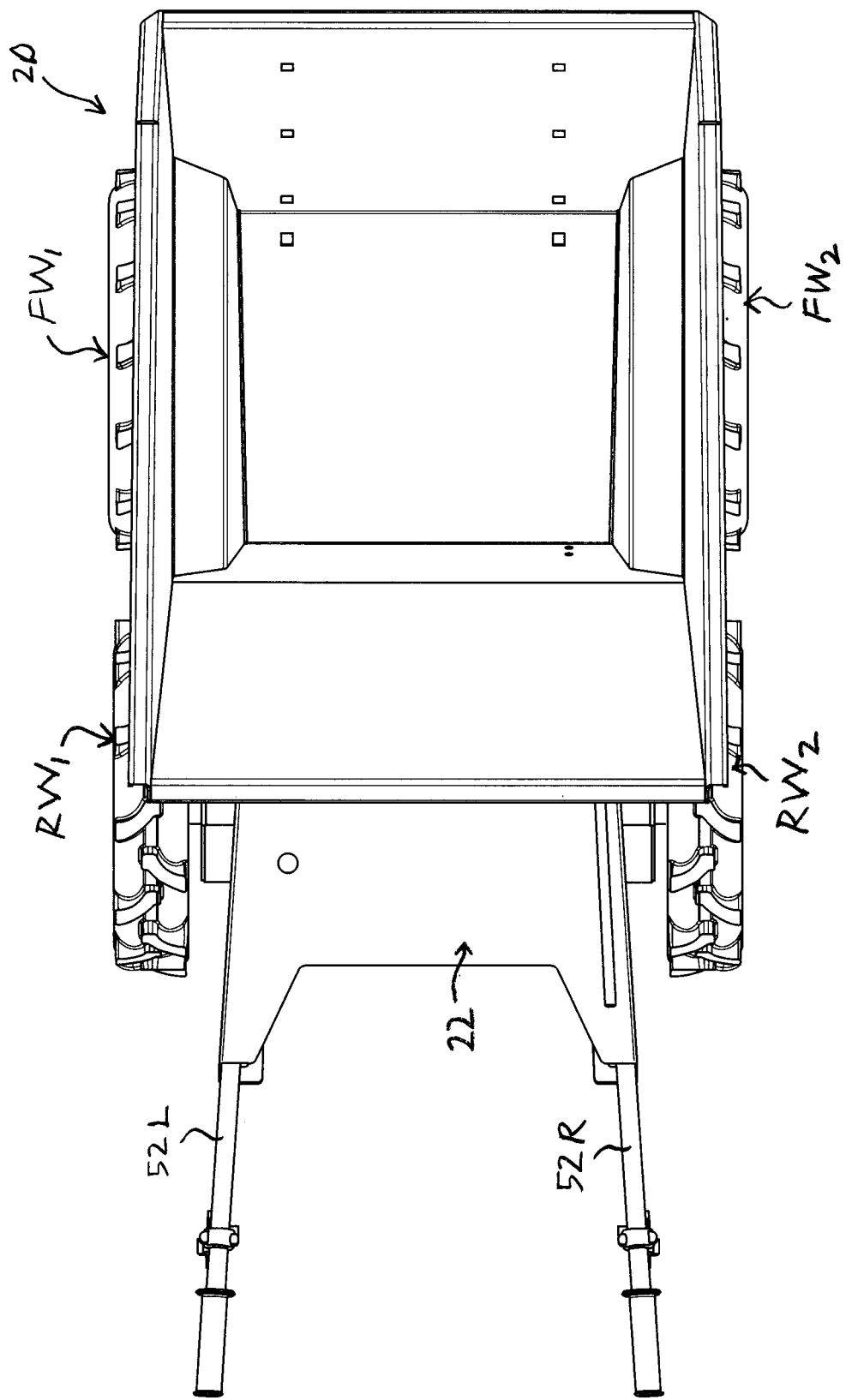
FIG. 5 is a top view of the motorized wheelbarrow of FIGS. 1-4.
Figure 6:
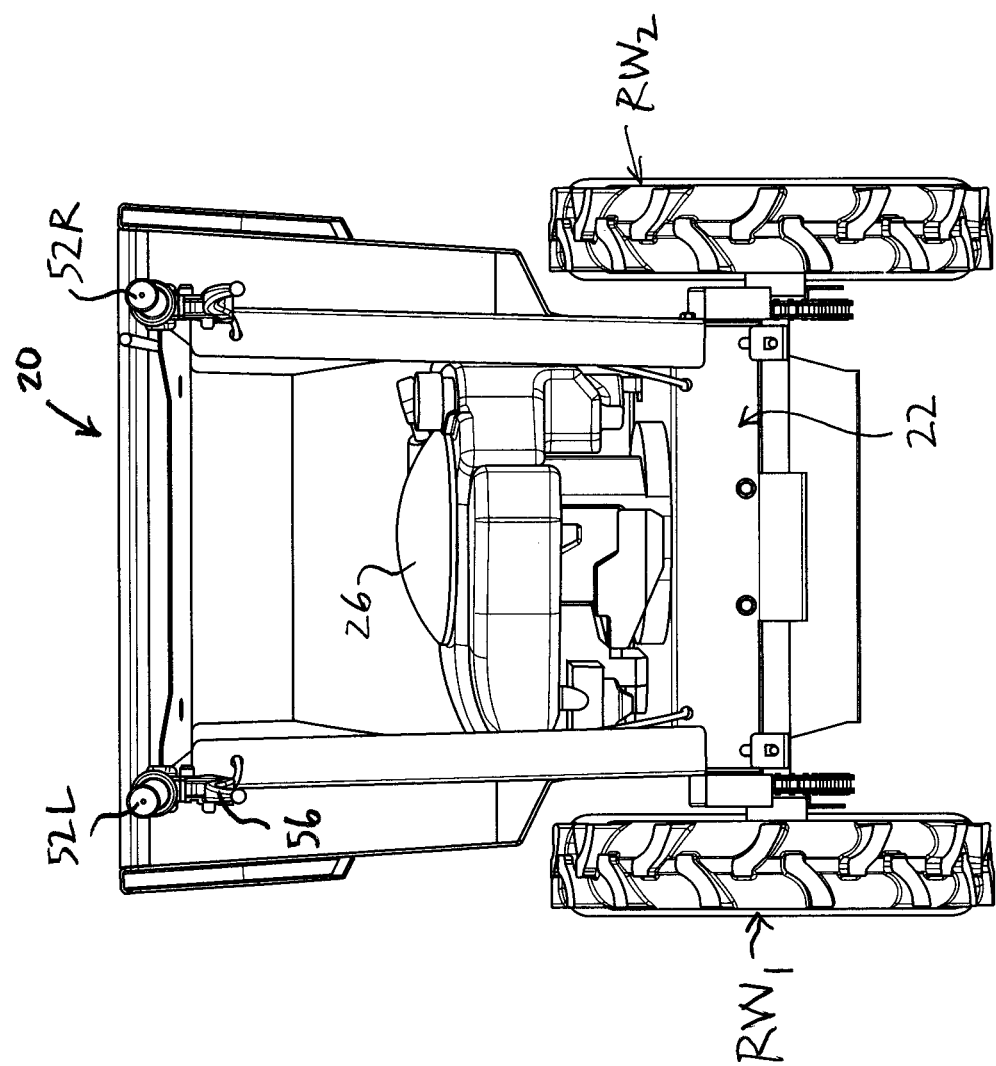
FIG. 6 is a rear side view of the motorized wheelbarrow of FIGS. 1-5.
Figure 9A:
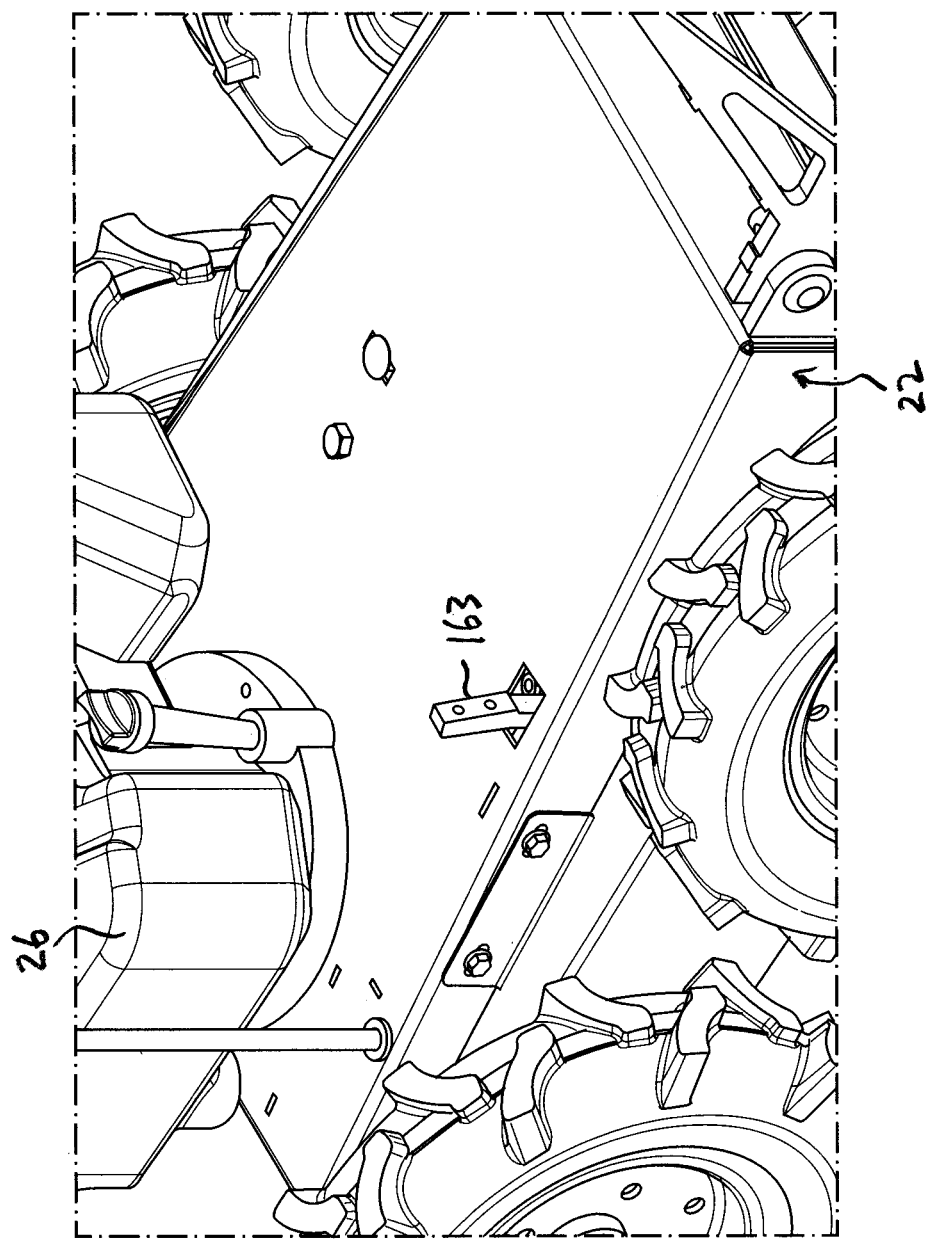
FIG. 9A is an isometric view of a lock hook of a lock assembly for securing a bucket in a load position, drawn at a smaller scale.
Figure 9B:
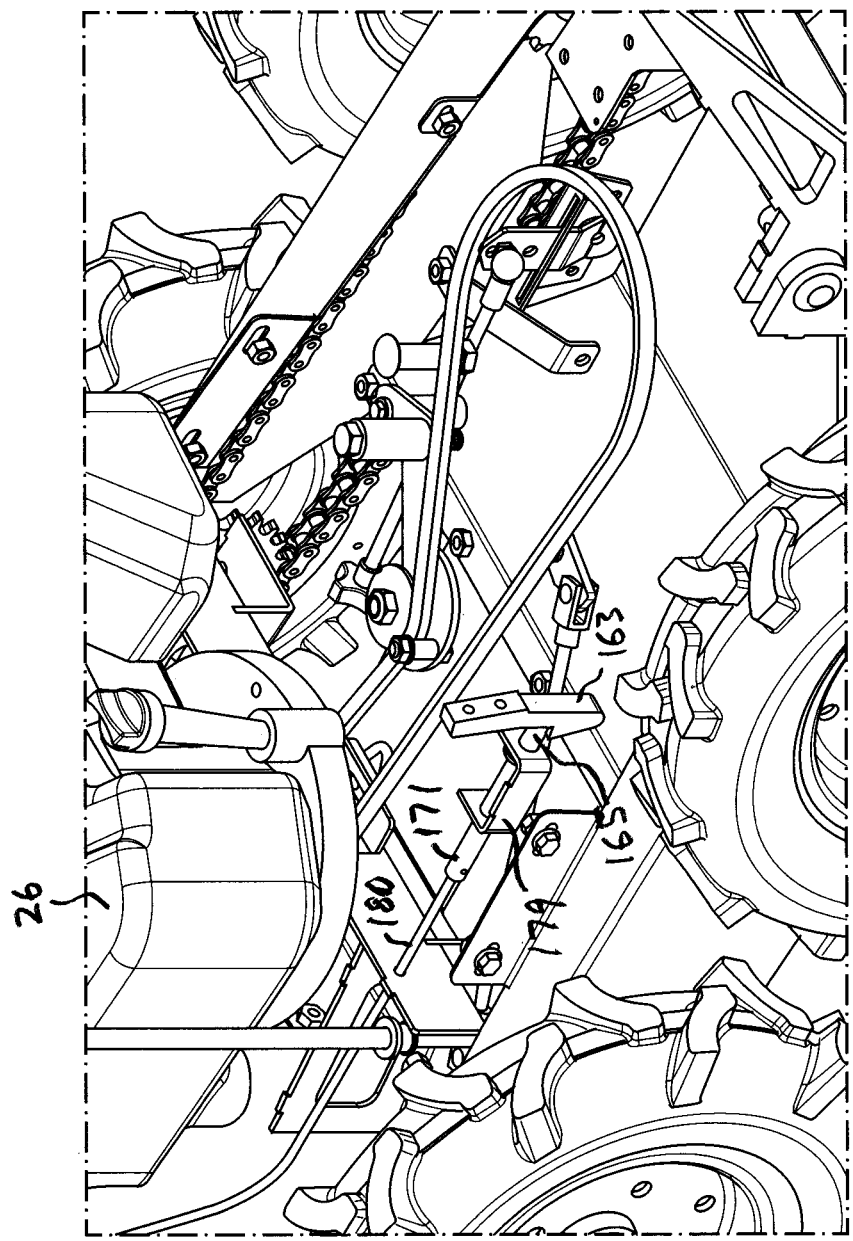
FIG. 9B is an isometric view of the lock assembly.
Figure 9C:
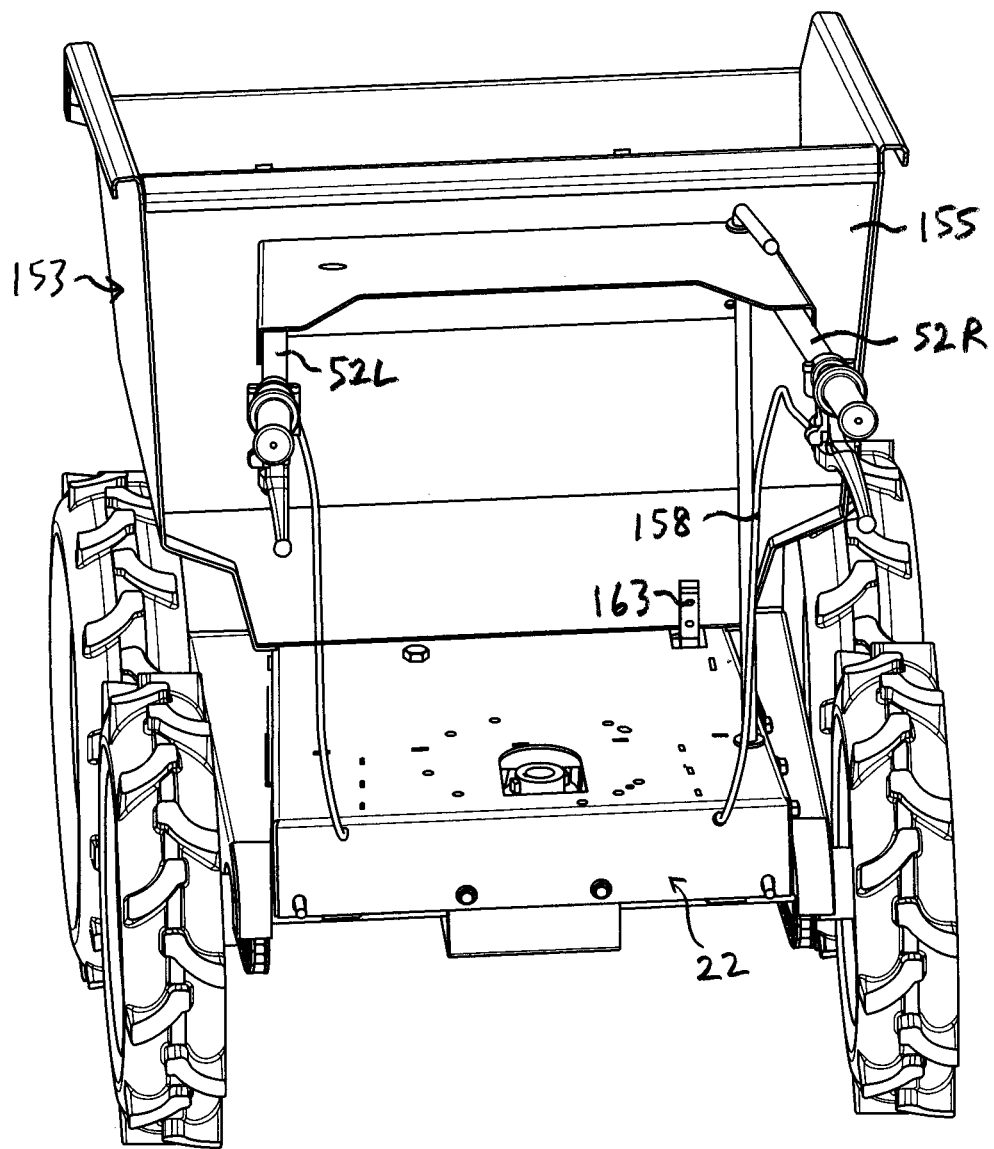
FIG. 9C is an isometric view of the rear side of the motorized wheelbarrow of FIG. 1, with certain elements omitted to show the lock hook mounted to the bucket.

As can be seen in FIGS. 1-2B, the motorized wheelbarrow 20 preferably includes a bucket 153 pivotably connected to the frame assembly 22 and movable between a load position (FIG. 2A), in which a load (not shown) is receivable in the bucket 153, and an unload position (FIG. 2B), in which the bucket 153 is positioned to allow the load to exit therefrom under the influence of gravity. When the bucket 153 is in the unload position thereof, the load exits therefrom as generally indicated by arrow "K" in FIG. 2B. The bucket 153 preferably includes a back wall 155 (FIGS. 5, 9C).

In one embodiment, the motorized wheelbarrow 20 preferably includes a lock assembly 161 for releasably securing the bucket 153 in the load position. Preferably, the lock assembly 161 includes a lock hook 163. It is preferred that the lock hook 163 is secured to the bucket 153.

The lock assembly 161 preferably also includes a latch element 165 and a latch element controller 167, for moving the latch element 165 between a lock position, in which the latch element 165 prevents movement of the lock hook 163 relative to the frame assembly 22, and an unlocked position, in which the latch element 165 is disengaged from the lock hook 163, to permit movement of the lock hook 163 with the bucket 153 relative to the frame assembly 22.

As will be described, it is also preferred that the latch element 165 is biased to the lock position by a resilient element 169.

In one embodiment, the latch element 165 preferably is connected with a latch lever 156 by a latch cable 159. The latch cable 15 may be any suitable cable, e.g., a cable assembly including an outer housing with an inner cable 180 inside the housing, for axial movement of the inner cable 180 relative to the housing. It is preferred that the latch lever 156 is movable between an activated position, in which the inner cable 180 is subjected to tension, to move the latch element 165 to the unlocked position thereof, and a relaxed position, in which the latch element 165 is allowed to be moved by the resilient element 169 until the latch element 165 engages the lock hook 163, to prevent movement of the lock hook 163 relative to the frame assembly 22. When the latch lever 156 is in the relaxed position, the inner cable 180 is not subjected to tension.

Figure 9D:
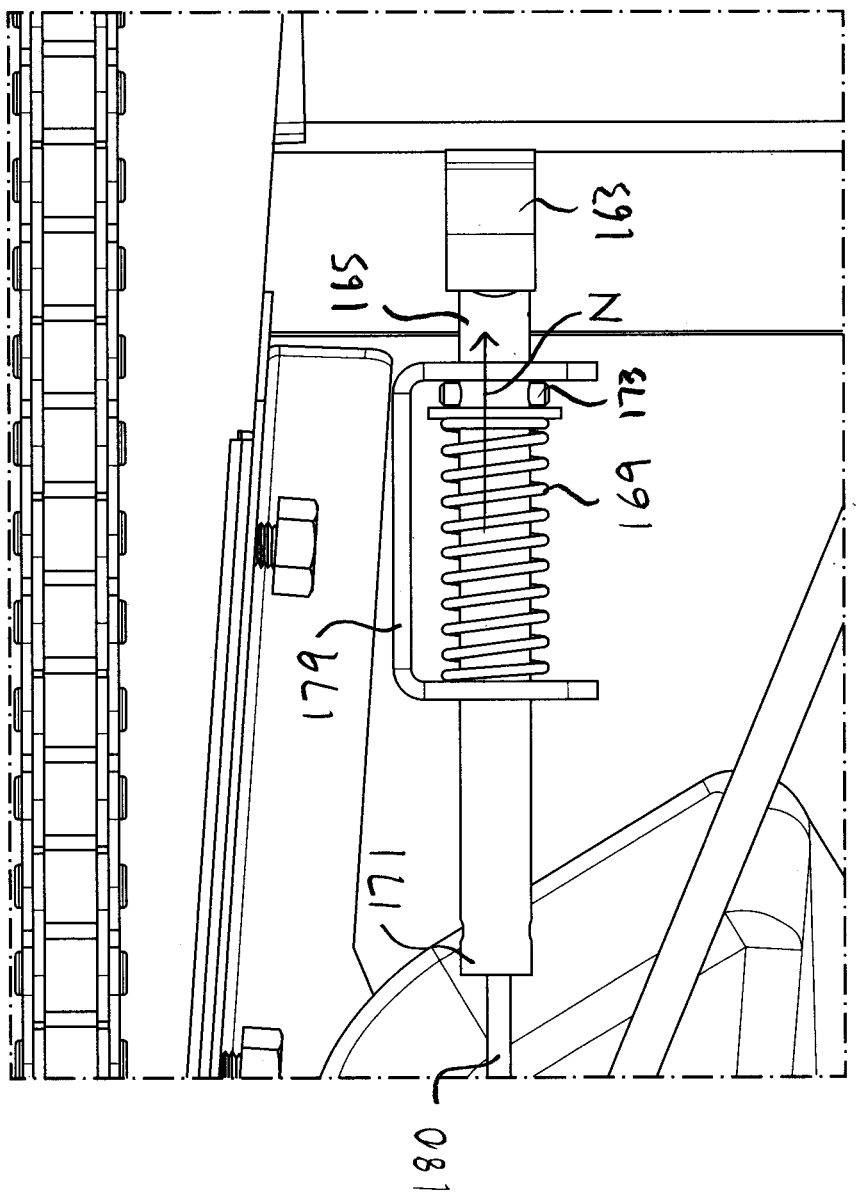
FIG. 9D is a bottom view of the lock assembly, drawn at a larger scale.
Figure 9E:
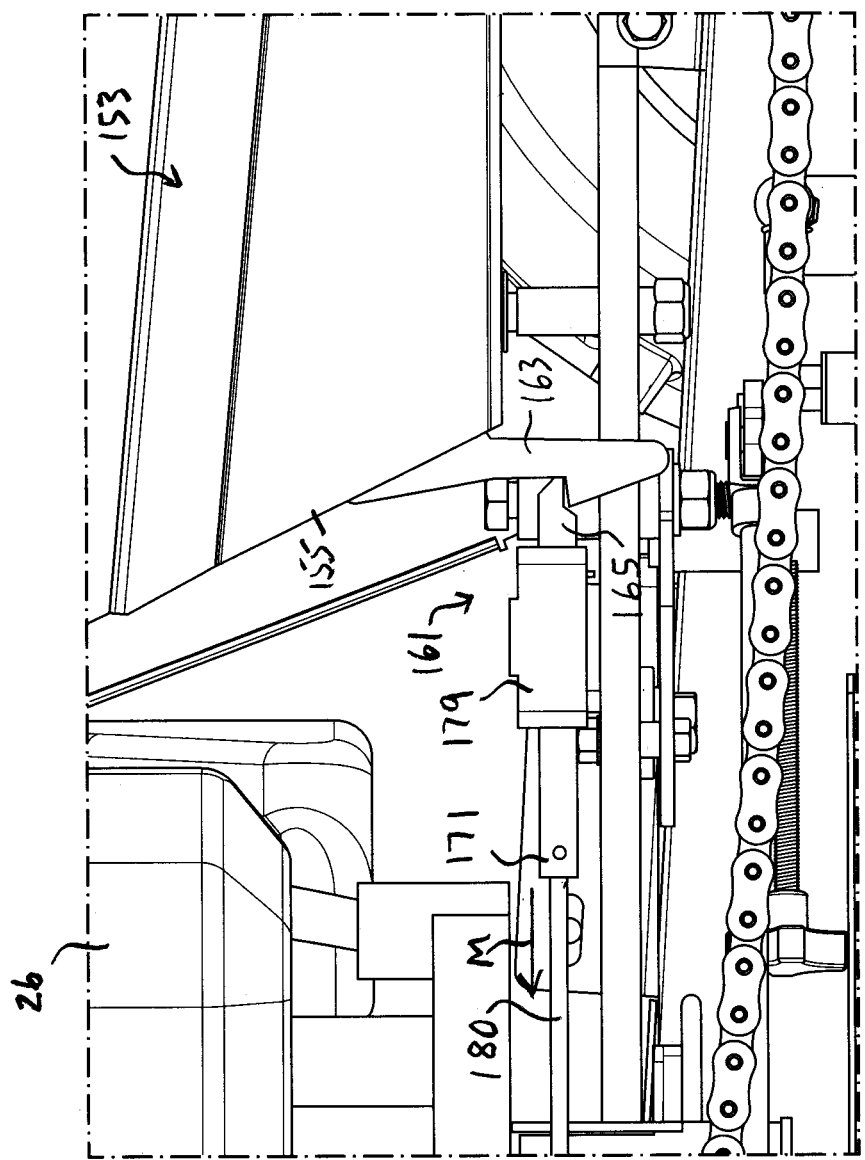
FIG. 9E is a side view of the lock assembly showing a latch element of the lock assembly in a lock position, engaging the lock hook.

The lock hook 163 can be seen mounted on the back wall 155 of the bucket 153 in FIGS. 2B, 9C, 9E, and 9F. As can be seen in FIG. 9E, when the latch element 165 is in the lock position, the latch element 165 is engaged with the lock hook 163, and the latch element 165 is positioned to prevent movement of the lock hook 163 upwardly, such upward movement being generally indicated by arrow "L" in FIG. 9F.

Preferably, the latch element 165 and the lock hook 163 include respective engagement surfaces 175, 177. The engagement surfaces 175, 177 preferably are formed so that, when the bucket is in the load position thereof and the latch element 165 is moved from its unlocked position to its lock position, the engagement surface 175 moves over the other engagement surface 177 for engagement thereof, to enable the latch element 165 to engage the lock hook 163.

It will be understood that the latch lever 156 is shown in the relaxed position thereof in solid outline in FIG. 2A. The latch lever 156 is shown in the activated position thereof in dashed outline in FIG. 2A. Preferably, the latch lever 156 is mounted to the right handlebar 52R.

As can be seen in FIG. 2A, in one embodiment, the latch lever 156 preferably is pivotably mounted to a latch lever bracket subassembly 157 that is secured to the right handlebar 52R. It is preferred that the latch lever bracket subassembly 157 includes a biasing means (not shown) that biases the latch lever 156 to the relaxed position. For example, the latch lever bracket subassembly 157 may include a spring or other resilient element (not shown) that urges the latch lever 156 to the relaxed position. Because those skilled in the art would be familiar with the mechanism of the latch lever bracket subassembly, further description of the latch lever bracket subassembly 157 is unnecessary.

Figure 9F:
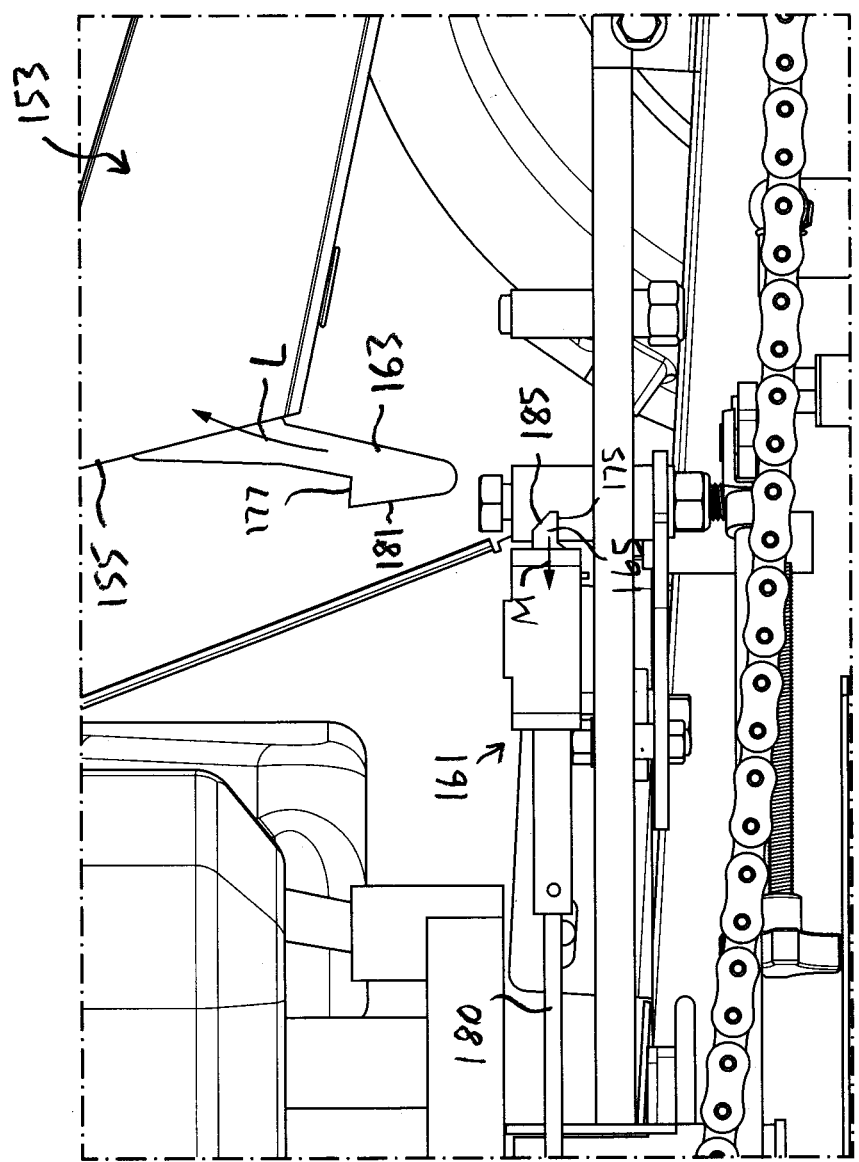
FIG. 9F is a side view of the lock assembly showing the latch element in the unlocked position.

It will be understood that the latch cable 159 includes an inner cable 180 that is subjected to tension when the latch lever 156 is moved from the relaxed position to the activated position thereof. The latch element 165 is connected at an inner end 171 thereof to the inner cable 180 (FIG. 9E). When the operator wishes to move the bucket 153 from the load position to the unload position thereof, the operator moves the latch lever 156 from the relaxed position to the activated position thereof. Subjecting the inner cable 180 to tension causes the cable to pull on the latch element 165, moving the latch element 165 in the direction indicated by arrow "M" in FIGS. 9E and 9F. The latch element 165 is moved to the unlocked position thereof (FIG. 9F). As can be seen in FIG. 9F, when the latch element 165 is in the unlocked position thereof, upward movement of the lock hook 163 is permitted. At this point, the bucket 153 may be moved to the unload position. In FIG. 9F, the bucket 153 is shown pivoting from the load position to the unload position.

Preferably, the lock assembly 161 includes a bracket 179 in which the resilient element 169 is mounted (FIG. 9D). As can be seen in FIG. 9D, the resilient element 169 is located between the bracket 179 and pins 173 extending from the latch element 165. The resilient element 169 urges the latch element 165 in the direction indicated by arrow "N" in FIG. 9D. Those skilled in the art would appreciate that the latch element 165 is biased to the lock position thereof by to the resilient element 169. It will be understood that, in order to move the latch element 165 from the lock position to the unlocked position thereof, the force used to pull the inner cable 180 is required to overcome the resistance of the resilient element 169 to movement of the latch element 165 in the direction indicated by arrow "M" in FIG. 9E.

Those skilled in the art would appreciate that, after the latch element 165 has been moved to the unlocked position and as the bucket 153 is moved toward the unload position, the operator may prefer to allow the latch lever 156 to return to the relaxed position. From the foregoing, it can be seen that, when the latch lever 156 is moved to the relaxed position, the resilient element 169 returns the latch element 165 to the lock position. In practice, therefore, the latch element 165 may be returned to the lock position while the bucket 153 is in the unload position thereof, or between the load and unload positions.

As can be seen in FIG. 9F, the lock hook 163 and the latch element 165 include first and second surfaces 181, 185 respectively that are formed to cooperate so that, when the latch element 165 is in the lock position and the lock hook 163 is lowered onto the latch element 165, the lock hook 163 pushes the latch element 165 in the direction indicated by arrow "M", to permit the bucket 153 to return to the load position. When the bucket 153 has returned to the load position thereof, the resilient element 169 moves the latch element 165 in the direction indicated by arrow "N" (FIG. 9D), i.e., to the lock position, to hold the lock hook 163 in place as shown in FIG. 9E.

In one embodiment, the front wheels "$FW_1$", "$FW_2$" and the rear wheels "$RW_1$", "$RW_2$" preferably include sprockets 187 (FIG. 8C). It will be understood that the sprockets 187 are mounted to the front and rear axles 32, 34. Preferably, the wheel assembly 30 also includes chains 189 (FIGS. 7A, 8C) that connect the sprockets 187 at the two front wheels with respective sprockets 187 on corresponding sides of the frame assembly 22 at the two rear wheels respectively, for transmitting power from the respective two front sprockets to the two rear wheels respectively.

As can be seen in FIG. 7A, the chain on the left side of the frame assembly 22 (identified by reference character 189L in FIG. 7A) connects sprockets at the front wheel "$FW_1$" and the rear wheel "$RW_1$" that are located on the left side of the frame assembly 22. The chain on the right side of the frame assembly 22 (identified by reference character 189R in FIG. 7A) connects sprockets at the front wheel "$FW_2$" and the rear wheel "$RW_2$" that are located on the rights side of the frame assembly 22. In this way, all four of the wheels of the motorized wheelbarrow 20 are operatively connected, for moving the motorized wheelbarrow.

In another embodiment, the motorized wheelbarrow 20 preferably includes a neutral locator 191 for guiding the drive belt 50 onto the drive pulley 26.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:
1. A motorized wheelbarrow comprising:
   (a) a frame assembly;
   (b) a motor assembly mounted to the frame assembly, the motor assembly comprising a motor and a drive pulley that rotates when the motor is operating;
   (c) a wheel assembly, comprising:
      (i) front and rear axles mounted to the frame assembly, the front and rear axles defining respective front and rear axes;

(ii) four wheels, comprising two front wheels that are rotatably mounted to the front axle, and two rear wheels are rotatably mounted to the rear axle, for rotation about the front and rear axes of rotation respectively;

(d) a drive train assembly for transmitting power from the motor to the wheels, the drive train assembly comprising:
  (i) a driven pulley;
  (ii) a transmission subassembly for transmitting power from the driven pulley to the front axle, the transmission subassembly comprising an output shaft subassembly rotatable about an axis of rotation thereof when the front axle is rotating;

(e) a clutch assembly, movable between a connected condition, in which the motor and the drive train assembly are connected by the clutch assembly to transmit power from the motor to the driven pulley and the driven shaft rotates about the axis of rotation thereof, and a disconnected condition, in which the motor and the driven pulley are not operably connected with each other;

(f) a brake assembly movable between an engaged condition, in which the brake assembly resists rotation of the output shaft subassembly, and a disengaged condition, in which the brake assembly permits rotation of the output shaft subassembly; and (g) a control assembly for controlling the clutch and brake assemblies, wherein the brake assembly is in the engaged condition when the clutch assembly is in the disconnected condition, and the brake assembly is in the disengaged condition when the clutch assembly is in the connected condition.

2. A motorized wheelbarrow according to claim 1 in which the brake assembly is biased to the engaged condition thereof and the clutch assembly is biased to the disconnected condition thereof.

3. A motorized wheelbarrow according to claim 1 in which:
  (a) the clutch assembly comprises:
    (i) a drive belt, configured to connect the motor and the drive train assembly when the drive belt is engaged with the drive pulley and the driven pulley;
    (ii) an idler pulley movable between an urging position, in which the idler pulley urges the drive belt in an inward direction, to cause the drive belt to connect the motor and the drive train assembly, and a released position, in which the idler pulley does not urge the drive belt in the inward direction;
  (b) the control assembly comprises:
    (i) a clutch lever, for locating the idler pulley in one of the urging position and the released position;
    (ii) a connecting subassembly, for operably connecting the clutch lever and the idler pulley; and
  (c) the clutch lever being movable between a first clutch lever position, in which the clutch assembly is in the connected condition, and a second clutch lever position, in which the clutch assembly is in the disconnected condition.

4. A motorized wheelbarrow according to claim 3 in which the connecting subassembly comprises:
  (a) a brake lever, movable between first and second brake lever positions thereof;
  (b) an idler arm pivot pin, secured to the frame assembly;
  (c) an idler arm extending between inner and outer ends thereof, the idler pulley being rotatably mounted on the inner end, and the idler arm being pivotable about the pivot pin between an engaged position, in which the idler pulley is in the urging position thereof to tighten the drive belt, wherein the drive belt is engaged with the drive pulley and the driven pulley, and a disengaged position, in which the idler pulley is in the released position thereof;
  (d) an elongate connecting rod defined by a connecting rod axis thereof, the connecting rod extending between a first end, at which the connecting rod is connected with the brake lever, and a second end, the connecting rod comprising an intermediate segment located between the first and second ends;
  (e) a fastener element located on the outer end of the idler arm and engaging the intermediate segment to secure the connecting rod to the outer end of the idler arm;
  (f) the brake lever is positioned in the first brake lever position thereof when the clutch lever is in the first clutch lever position; and
  (g) when the when the brake lever is in the first brake lever position, the brake lever locates the connecting rod such that the idler pulley is in the urging position thereof, pushing inwardly against the drive belt.

5. A motorized wheelbarrow according to claim 4 in which the connecting subassembly additionally comprises a ball joint fitting connecting the first end of the connecting rod and the brake lever.

6. A motorized wheelbarrow according to claim 5 in which the fastener element and the intermediate segment of the connecting rod are threadably engaged.

7. A motorized wheelbarrow according to claim 6 in which rotation of the connecting rod about the connecting rod axis causes the position of the inner end of the idler arm relative to the ball joint fitting to be changed, for adjusting the engaged position of the idler arm relative to the drive belt.

8. A motorized wheelbarrow according to claim 4 in which:
  (a) the brake assembly comprises:
    (i) at least one brake shoe movable between a second position, in which said at least one brake shoe is engaged with the output shaft subassembly to resist rotation of the output shaft subassembly, and a first position, in which said at least one brake shoe is not urged against the output shaft subassembly, and;
    (ii) at least one brake pin movable between a second brake pin position, in which said at least one brake pin urges said at least one brake shoe against the output shaft subassembly, and a first brake pin position, in which said at least one brake pin does not urge said at least one brake shoe against the output shaft subassembly;
    (iii) the brake lever being formed to move said at least one brake pin from the first brake pin position to the second brake pin position, to push said at least one brake pin against said at least one brake shoe, when the brake lever is moved to the second brake lever position; and
  (b) the control assembly comprises a brake lever spring for biasing the brake lever to the second brake lever position.

9. A motorized wheelbarrow according to claim 8 in which the brake lever pivots from the second brake lever position to the first brake lever position when the clutch lever is moved from the second clutch lever position to the first clutch lever position.

10. A motorized wheelbarrow according to claim 9 in which the brake lever comprises at least one camming surface that engages said at least one brake pin as the brake lever pivots from the first brake lever position to the second brake lever position, said at least one camming surface disengaging from said at least one brake pin when the brake lever pivots from the second brake lever position to the first brake lever position.

11. A motorized wheelbarrow according to claim 1 additionally comprising a bucket pivotably connected to the frame assembly and movable between a load position, in which a load is receivable in the bucket, and an unload position, in which the bucket is positioned to allow the load to exit therefrom under the influence of gravity.

12. A motorized wheelbarrow according to claim 11 additionally comprising a lock assembly for releasably securing the bucket in the load position, the lock assembly comprising:
   (a) a lock hook secured to the bucket; and
   (b) a lock control subassembly comprising:
      (i) a latch element;
      (ii) a latch element controller, for moving the latch element between a lock position, in which the latch element prevents movement of the lock hook relative to the frame assembly, and an unlocked position, in which the latch element is disengaged from the lock hook, to permit movement of the lock hook with the bucket relative to the frame assembly.

13. A motorized wheelbarrow according to claim 12 in which the latch element is biased to the lock position by a resilient element.

14. A motorized wheelbarrow according to claim 13 in which the latch element controller comprises a connecting cable connecting the latch element with a latch lever, and the latch lever is movable between an activated position, in which the cable is subjected to tension, to move the latch element to the unlocked position thereof, and a relaxed position, in which the latch element is allowed to be moved by the resilient element until the latch element engages the lock hook, to prevent movement of the lock hook relative to the frame assembly.

15. A motorized wheelbarrow according to claim 10 in which:
   (a) the two front wheels and the two rear wheels respectively comprise sprockets; and
   (b) the wheel assembly additionally comprises chains respectively connecting the sprockets at the two front wheels to the sprockets on corresponding sides of the frame assembly at the two rear wheels, for transmitting power from the respective two front wheels to the respective two rear wheels.

16. A motorized wheelbarrow according to claim 4 additionally comprising a neutral locator for guiding the drive belt onto the drive pulley.

* * * * *